(12) United States Patent
Adler et al.

(10) Patent No.: US 10,030,995 B2
(45) Date of Patent: Jul. 24, 2018

(54) CONTROLLER FOR AN AIRCRAFT TRACKER

(71) Applicant: The Boeing Company, Chicago, IL (US)

(72) Inventors: Charles Otis Adler, Bellevue, WA (US); Ted Eigle, Upland, CA (US); William Raymond Richards, Mercer Island, WA (US); Timothy Allen Murphy, Mukilteo, WA (US); John Harvey Roberson, Fountain Valley, CA (US); Thomas Jose Thalakottur, Folsom, PA (US); Ricardo Messias Fricks, Lake Stevens, WA (US); Fadl Ibrahim Khalil, Edmonds, WA (US); Steven Mark Walstrom, Lynnwood, WA (US); Daniel Bruce Holton, Edmonds, WA (US); Jessie Turner, Mukilteo, WA (US); Timothy Edward Jackson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/858,235

(22) Filed: Sep. 18, 2015

(65) Prior Publication Data

US 2017/0082455 A1    Mar. 23, 2017

(51) Int. Cl.
*G01C 23/00* (2006.01)
*B64D 45/00* (2006.01)
(Continued)

(52) U.S. Cl.
CPC ............ *G01C 23/00* (2013.01); *B64D 45/00* (2013.01); *G01S 13/91* (2013.01); *G01S 19/17* (2013.01);
(Continued)

(58) Field of Classification Search
CPC ............. B64D 7/00; B64D 2045/0045; B64D 45/0015; B64D 47/04; B64D 11/0015;
(Continued)

(56) References Cited

U.S. PATENT DOCUMENTS

| 4,674,704 A | 6/1987 | Altoz et al. |
| 5,379,224 A | 1/1995 | Brown et al. |

(Continued)

FOREIGN PATENT DOCUMENTS

| EP | 0559074 A1 | 9/1993 |
| EP | 1918733 A1 | 5/2008 |

(Continued)

OTHER PUBLICATIONS

Extended European Search Report, dated Nov. 22, 2016, regarding Application No. EP16184621, 7 pages.

(Continued)

*Primary Examiner* — Anne M Antonucci
*Assistant Examiner* — Sanjeev Malhotra
(74) *Attorney, Agent, or Firm* — Yee & Associates, P.C.

(57) ABSTRACT

A method, apparatus, and aircraft tracker system for reporting state information for an aircraft. A state of the aircraft is identified using sensor data received from an aircraft sensor system in the aircraft. The state information is transmitted at a reporting rate set using the state of the aircraft identified from the sensor data, at least one of a crew command or a ground command when at least one of the crew command is received from a crew interface or the ground command is received from a ground source, and a policy defining priorities for reporting that are based on at least one of the crew command, the ground command, or the state of the aircraft identified from the sensor data.

20 Claims, 19 Drawing Sheets

(51) Int. Cl.
*G07C 5/08* (2006.01)
*G08G 5/00* (2006.01)
*G01S 19/17* (2010.01)
*G01S 13/91* (2006.01)
*G07C 5/00* (2006.01)

(52) U.S. Cl.
CPC ........... *G07C 5/085* (2013.01); *G08G 5/0013* (2013.01); *G08G 5/0021* (2013.01); *B64D 2045/0045* (2013.01); *B64D 2045/0065* (2013.01); *G01S 2205/002* (2013.01); *G07C 5/008* (2013.01); *G08G 5/0056* (2013.01)

(58) Field of Classification Search
CPC ... F41H 11/02; F41H 13/0056; B64C 1/1415; B64C 29/0025; G01S 13/723; G01S 13/726; G01S 13/867; G01S 13/91; G01S 3/7865; G01S 5/0027; G01S 7/003; G01S 7/021; G01S 7/295; G01S 7/36; G01S 7/38; G01S 7/495; G02B 27/017; G06K 9/3241; G06N 5/02; G06N 5/046; G06Q 10/06375; G08G 5/0013; G08G 5/0021; G08G 5/0082; G08G 5/065
USPC ..... 244/1 R, 118.1, 2; 342/29, 52, 107, 162, 342/357.31; 340/815.45, 945; 382/103; 345/467, 632
See application file for complete search history.

(56) References Cited

U.S. PATENT DOCUMENTS

| | | | |
|---|---|---|---|
| 5,927,648 A * | 7/1999 | Woodland | B64C 1/1415 244/118.1 |
| 5,974,158 A * | 10/1999 | Auty | G06K 9/3241 382/103 |
| 6,799,094 B1 * | 9/2004 | Vaida | B64D 45/0015 342/357.31 |
| 7,196,621 B2 | 3/2007 | Kochis | |
| 7,218,227 B2 | 5/2007 | Davis et al. | |
| 7,375,679 B1 * | 5/2008 | Mookerjee | G01S 7/295 342/162 |
| 7,898,425 B2 | 3/2011 | Nagy et al. | |
| 8,614,633 B1 * | 12/2013 | Lear | G08B 29/188 114/382 |
| 9,031,497 B1 | 5/2015 | Hoffman et al. | |
| 9,049,585 B1 | 6/2015 | Hoffman et al. | |
| 2003/0032426 A1 | 2/2003 | Gilbert et al. | |
| 2003/0193409 A1 | 10/2003 | Crank | |
| 2005/0007257 A1 * | 1/2005 | Rast | B64D 47/04 340/815.45 |
| 2006/0187026 A1 | 8/2006 | Kochis | |
| 2007/0159378 A1 * | 7/2007 | Powers | G01S 7/003 342/29 |
| 2008/0191863 A1 | 8/2008 | Boling et al. | |
| 2008/0258885 A1 | 10/2008 | Akhan | |
| 2009/0173822 A1 * | 7/2009 | Kravitz | B64D 7/00 244/1 R |
| 2009/0284552 A1 * | 11/2009 | Larson | G02B 27/01 345/632 |
| 2010/0026523 A1 * | 2/2010 | McCullough | G08G 5/003 340/971 |
| 2010/0109912 A1 * | 5/2010 | Stokes | B64D 45/0015 340/945 |
| 2010/0253567 A1 * | 10/2010 | Factor | G01S 7/36 342/52 |
| 2012/0166016 A1 | 6/2012 | Bartley | |
| 2012/0191273 A1 | 7/2012 | Jacobs et al. | |
| 2012/0200460 A1 | 8/2012 | Weed et al. | |
| 2012/0274643 A1 * | 11/2012 | Tanaka | B64D 11/0015 345/467 |
| 2013/0023205 A1 | 1/2013 | Trautenberg | |
| 2013/0112804 A1 * | 5/2013 | Zhu | B64C 29/0025 244/2 |
| 2013/0229298 A1 * | 9/2013 | Eckstein | G01S 13/726 342/107 |
| 2014/0225769 A1 | 8/2014 | Akcasu et al. | |
| 2015/0007080 A1 | 1/2015 | Nama et al. | |
| 2015/0203218 A1 | 7/2015 | Martegani | |
| 2016/0217381 A1 * | 7/2016 | Bloomquist | G06N 5/02 |
| 2017/0043881 A1 * | 2/2017 | Fleck | B64C 1/1469 |

FOREIGN PATENT DOCUMENTS

| | | |
|---|---|---|
| EP | 2348496 A1 | 7/2011 |
| EP | 2882010 A1 | 6/2015 |
| WO | WO9602905 A1 | 2/1996 |
| WO | WO03104834 A2 | 12/2003 |
| WO | WO2012011825 A1 | 1/2012 |

OTHER PUBLICATIONS

Extended European Search Report, dated Feb. 7, 2017, regarding Application No. EP16188916.7, 10 pages.
Extended European Search Report, dated Sep. 27, 2017, regarding Application No. EP16184621.7, 6 pages.
Office Action dated Jul. 12, 2017, U.S. Appl. No. 14/832,879, 28 pages.
Office Action, dated Jul. 12, 2017, regarding U.S. Appl. No. 14/832,879, 28 pages.
Murphy, "Aircraft Tracking Method and Device and Method of Installation," U.S. Appl. No. 14/832,879, filed Aug. 21, 2015, 53 pages.
Murphy, "Aircraft Distress Tracking and Interface to Search and Rescue System," U.S. Appl. No. 14/832,851, filed Aug. 21, 2015, 59 pages.

* cited by examiner

| INPUT REQUESTS \ TRANSMIT STATE | TRANSMIT-ON | TRANSMIT-ON | TRANSMIT-OFF | TRANSMIT-OFF | TRANSMIT-ON |
|---|---|---|---|---|---|
| FLIGHT CREW INPUT TRANSMIT STATE REQUEST | TRANSMIT-ON | NO REQUEST | NO REQUEST | NO REQUEST | NO REQUEST |
| GROUND SEGMENT COMMAND TRANSMIT STATE REQUEST | ANY | TRANSMIT-ON | TRANSMIT-OFF | NO REQUEST | NO REQUEST |
| AIRCRAFT POSITION BASED REPORTING RATE FUNCTION TRANSMIT STATE REQUEST | ANY | ANY | ANY | TRANSMIT-OFF | NO REQUEST |

| 1100 | 1102 | 1104 | 1106 | 1112 | 1114 | 1116 |
|---|---|---|---|---|---|---|
| CRITERIA TYPE | CRITERIA NAME | TRIGGER CONDITIONS | PERSISTENCE TIME (EXAMPLE DEFAULT VALUES) | CURRENT POSITION IN AREA TYPE | GEOFENCING DEPENDENCE — ALTITUDE | PARAMETERS (EXAMPLE DEFAULT VALUES) | AIRCRAFT BEHAVIOR DYNAMIC TRIGGER STATE SETTING |
| UNUSUAL ATTITUDE | EXCESSIVE BANK | {|ROLL|>R1°} OR {|ROLL|>R2° AND |ROLL RATE|>R3°/s} | 1 SEC (1108) | INSIDE REPORTING REGION (OCEANIC OR REMOTE) | ALT>10000 FT | R1=10° R2=5° R3=2° | ABNORMAL |
| | | | | | 10000 FT ≥ ALT > 0 FT | R1=14° R2=9° R3=2° | DISTRESS |
| | | | 2 SEC (1110) | OUTSIDE REPORTING REGION (ATC COVERAGE) | ANY ALTITUDE | R1=21° R2=14° R3=2° | ABNORMAL |
| | | | | | ANY ALTITUDE | R1=25° R2=15° R3=2° | DISTRESS |

FIG. 12

| 1200 CRITERIA TYPE | CRITERIA NAME | 1202 TRIGGER CONDITIONS | 1204 PERSISTENCE TIME (EXAMPLE DEFAULT VALUES) | 1206 CURRENT POSITION IN AREA TYPE | 1212 ALTITUDE | 1214 GEOFENCING DEPENDENCE PARAMETERS (EXAMPLE DEFAULT VALUES) | 1216 AIRCRAFT BEHAVIOR DYNAMIC TRIGGER STATE SETTING |
|---|---|---|---|---|---|---|---|
| UNUSUAL ATTITUDE | EXCESSIVE PITCH | {PITCH>P1°} OR {PITCH<P2°} OR {PITCH>P3° AND PITCH RATE>P4°/S} OR {PITCH<P5° AND PITCH RATE<P6°/S} | 1 SEC | INSIDE REPORTING REGION (OCEANIC OR REMOTE) | ALT>15000 FT | P1=14° P2=14° P3=8° P4=3° P5=12° P6=5° | ABNORMAL |
| | | | | | 15000 FT≥ALT>0 FT | P1=44° P2=34° P3=34° P4=7° P5=9° P6=5° | DISTRESS |
| | | | 2 SEC | OUTSIDE REPORTING REGION (ACT COVERAGE) | ANY | P1=18° P2=18° P3=8° P4=4° P5=16° P6=6° | ABNORMAL |
| | | | | | ANY | P1=48° P2=38° P3=38° P4=8° P5=10° P6=7° | DISTRESS |

FIG. 13

| CRITERIA TYPE 1300 | CRITERIA NAME | TRIGGER CONDITIONS 1302 | PERSISTENCE TIME (EXAMPLE DEFAULT VALUES) 1304 | CURRENT POSITION IN AREA TYPE 1306 | ALTITUDE 1312 | GEOFENCING DEPENDENCE 1314 PARAMETERS (EXAMPLE DEFAULT VALUES) | AIRCRAFT BEHAVIOR DYNAMIC TRIGGER STATE SETTING 1316 |
|---|---|---|---|---|---|---|---|
| UNUSUAL SPEED | HORIZONTAL SPEED | HORIZ GPS VELOCITY > VL1 nm/h OR HORIZ GPS VELOCITY < VL2 nm/h | 1 SEC | INSIDE REPORTING REGION (OCEANIC OR REMOTE) | ALT>20000 FT | VL1=2000 VL2=500 | ABNORMAL |
| | | | | | 20000 FT≥ALT>0 FT | VL1=2500 VL2=400 | DISTRESS |
| | | | 2 SEC | OUTSIDE REPORTING REGION (ATC COVERAGE) | ALT>10000 FT | VL1=2200 VL2=450 | ABNORMAL |
| | | | | | 10000 FT≥ALT>0 FT | VL1=3200 VL2=200 | DISTRESS |
| UNUSUAL SPEED | EXCESSIVE VERTICAL SPEED (V/S) | {|V/S| > VX1 ft/min} | 2 SEC | INSIDE REPORTING REGION (OCEANIC OR REMOTE) | ANY ALTITUDE | VX1=12000 | ABNORMAL |
| | | | | | 25000 FT≥ALT>0 FT | VL1=13000 | DISTRESS |
| | | | | OUTSIDE REPORTING REGION (ATC COVERAGE) | ANY ALTITUDE | VL1=9000 | ABNORMAL |
| | | | | | 15000 FT≥ALT>0 FT | VL1=10000 | DISTRESS |

| CRITERIA TYPE | CRITERIA NAME | TRIGGER CONDITIONS 1402 | PERSISTENCE TIME (EXAMPLE DEFAULT VALUES) 1404 | CURRENT POSITION IN AREA TYPE 1406 | ALTITUDE 1412 | PARAMETERS (EXAMPLE DEFAULT VALUES) | AIRCRAFT BEHAVIOR DYNAMIC TRIGGER STATE SETTING 1416 |
|---|---|---|---|---|---|---|---|
| UNUSUAL ALTITUDE | ALTITUDE | GNSS DERIVED ALTITUDE-ALT | 1 SEC | INSIDE REPORTING REGION (OCEANIC OR REMOTE) | ALT>25000 FT | n/a | STANDBY |
| | | | | | 25000 FT>ALT>10000 FT | n/a | ABNORMAL |
| | | | | | 10000 FT≥ALT | n/a | DISTRESS |
| | | | | OUTSIDE REPORTING REGION (ATC COVERAGE) | ANY ALTITUDE | n/a | STANDBY |

| CRITERIA TYPE | CRITERIA NAME 1502 | TRIGGER CONDITIONS | PERSISTENCE TIME (EXAMPLE DEFAULT VALUES) 1504 | CURRENT POSITION IN AREA TYPE 1506 | GEOFENCING DEPENDENCE 1512 ALTITUDE | PARAMETERS (EXAMPLE DEFAULT VALUES) 1514 | AIRCRAFT BEHAVIOR DYNAMIC TRIGGER STATE SETTING 1516 |
|---|---|---|---|---|---|---|---|
| UNUSUAL MANEUVER | TRACK CHANGE | GPS DERIVED TRACK CHANGE > TC° | WITHIN A 1 MIN PERIOD | INSIDE REPORTING REGION (OCEANIC OR REMOTE) | ALT>25000 FT | TC=60° | ABNORMAL |
| | | | | | 25000 FT≥ALT>10000 FT | TC=50° | DISTRESS |
| | | | | OUTSIDE REPORTING REGION (ATC COVERAGE) | ANY | ANY | STANDBY |

CONTROLLER FOR AN AIRCRAFT TRACKER

CROSS-REFERENCE TO RELATED APPLICATIONS

This application is related to the following U.S. Patent Applications entitled: "Aircraft Tracking Method and Device and Method of Installation," U.S. Ser. No. 14/832,879, filed Aug. 21, 2015, and entitled: "Aircraft Distress Tracking and Interface to Search and Rescue System," U.S. Ser. No. 14/832,851, filed Aug. 21, 2015, both of which are incorporated herein by reference in their entirety.

BACKGROUND INFORMATION

1. Field

The present disclosure relates generally to aircraft and, in particular, to an aircraft tracking system. More specifically, the present disclosure relates to a method and apparatus for controlling operation of an aircraft tracking system.

2. Background

Many aircraft carry systems that provide broadcasts of aircraft location for tracking and emergency location purposes. Aircraft systems that provide tracking or an emergency location function include distress radio beacons such as emergency locator transmitters (ELTs), transponder systems such as the Automatic Dependent Surveillance-Broadcast (ADS-B) systems, aircraft communication systems implementing Aircraft Communications Addressing and Reporting System (ACARS) based position reporting systems and specialized tracking systems providing dedicated communications links and tracking capabilities. These existing tracking and emergency location systems respond to a variety of control inputs to determine their reporting rates and the content of their reports is generally responsive to some combination of flight crew inputs, aircraft state inputs and, in some cases, ground based command inputs.

Emergency locator transmitters systems allow for activation and deactivation of distress beacons by crew members of the aircraft. Emergency locator transmitters include internal sensors to detect high temperatures and high decelerations indicative of a crash and use these to automatically trigger transmissions. These automatically triggered transmissions can be deactivated by the crew of the aircraft. For example, if transmissions are set off by a hard landing, they may be deactivated by the crew. The system may use aircraft inputs to provide aircraft location data in the distress broadcasts but are otherwise autonomous. These systems do not have ground based command inputs. In next generation emergency locator transmitters, which are desired to be more tamper proof, it is also desirable to use aircraft state data to trigger broadcasts prior to an incident.

Transponder systems such as the Automatic Dependent Surveillance-Broadcast (ADS-B) broadcast aircraft location and state data to ground based, airborne or satellite based receivers. These systems allow a crew member to enter distress codes. These systems have no autonomy and are completely dependent on other aircraft systems. In some cases, these systems allow the crew members to turn off the overall system to stop the position broadcasts.

Specialized aircraft tracking systems can use existing or dedicated aircraft radio or satellite communications links to send periodic aircraft position reports. These systems also may be programmed to use aircraft state and position information from aircraft avionics systems to trigger higher reporting rates and incident reports. These systems typically support crew activation and deactivation and ground based commands. These systems may have internal sensors to detect aircraft position and state variables. These existing systems may have limited tamper-proofing functions and may have varying responsiveness to crew member and ground control inputs.

Limitations for these existing systems include having limited or no autonomy from other aircraft systems, providing limited or no functions to prevent the flight crew from disabling the tracking functionality, such as tamper-proofing, the lack of the ability of significant system stakeholders such as crew members of the aircraft, ground controllers, or a combination thereof to trigger transmissions, limited or no ability to autonomously detect and trigger broadcasts on indications of aircraft abnormal conditions and providing limited or no support for higher level system control options.

Therefore, it would be desirable to have a method and apparatus that take into account one or more of the issues discussed above, as well as other possible issues. For example, it would be desirable to have a method and apparatus that overcome a technical problem with tampering with emergency locator transmitters. As another example, it would be desirable to have a method and apparatus that overcome a technical problem the economy in controlling reporting information about aircraft.

SUMMARY

An embodiment of the present disclosure provides an apparatus comprising an aircraft tracker. The aircraft tracker is configured to identify a state of an aircraft using sensor data received from an aircraft sensor system in the aircraft; receive a crew command from a crew interface; receive a ground command from a ground source; and transmit state information at a reporting rate set using the state of the aircraft identified from the sensor data, at least one of the crew command or the ground command when the at least one of the crew command or the ground command is received, and a policy defining priorities for reporting that are based on at least one of the crew command, the ground command, or the state of the aircraft identified from the sensor data.

Another embodiment of the present disclosure provides an aircraft tracking system comprising a housing that is tamper-resistant, a sensor system, a behavior analyzer, a state information reporter, and a communications system located in the housing. The sensor system is configured to generate sensor data about an aircraft. The behavior analyzer is configured to identify the state of the aircraft using the sensor data. The state information reporter is configured to report the state information at the reporting rate set using the state of the aircraft identified from the sensor data, at least one of a crew command or a ground command when the at least one of the crew command or the ground command is received, and a location of the aircraft. The communications system is configured to receive the ground command and send the state information transmitted by the state information reporter.

Yet another embodiment of the present disclosure provides a method for reporting state information for an aircraft. A state of the aircraft is identified using sensor data received from an aircraft sensor system in the aircraft. The state information is transmitted at a reporting rate set using the state of the aircraft identified from the sensor data, at least one of a crew command or a ground command when at least one of the crew command is received from a crew interface or the ground command is received from a ground source, and a policy defining priorities for reporting that are based on at least one of the crew command, the ground command, or the state of the aircraft identified from the sensor data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a table identifying whether state information should be transmitted in which a flight crew command is given the highest priority in accordance with an illustrative embodiment;

FIG. 11 is an illustration of a table of trigger conditions for excessive banking in accordance with an illustrative embodiment;

FIG. 12 is an illustration of a table of trigger conditions for excessive pitch in accordance with an illustrative embodiment;

FIG. 13 is an illustration of a table of trigger conditions for excessive speed in accordance with an illustrative embodiment;

FIG. 14 is an illustration of a table of states for altitudes in accordance with an illustrative embodiment;

FIG. 15 is an illustration of a table of trigger conditions for track changes in accordance with an illustrative embodiment;

DETAILED DESCRIPTION

Figure 1:
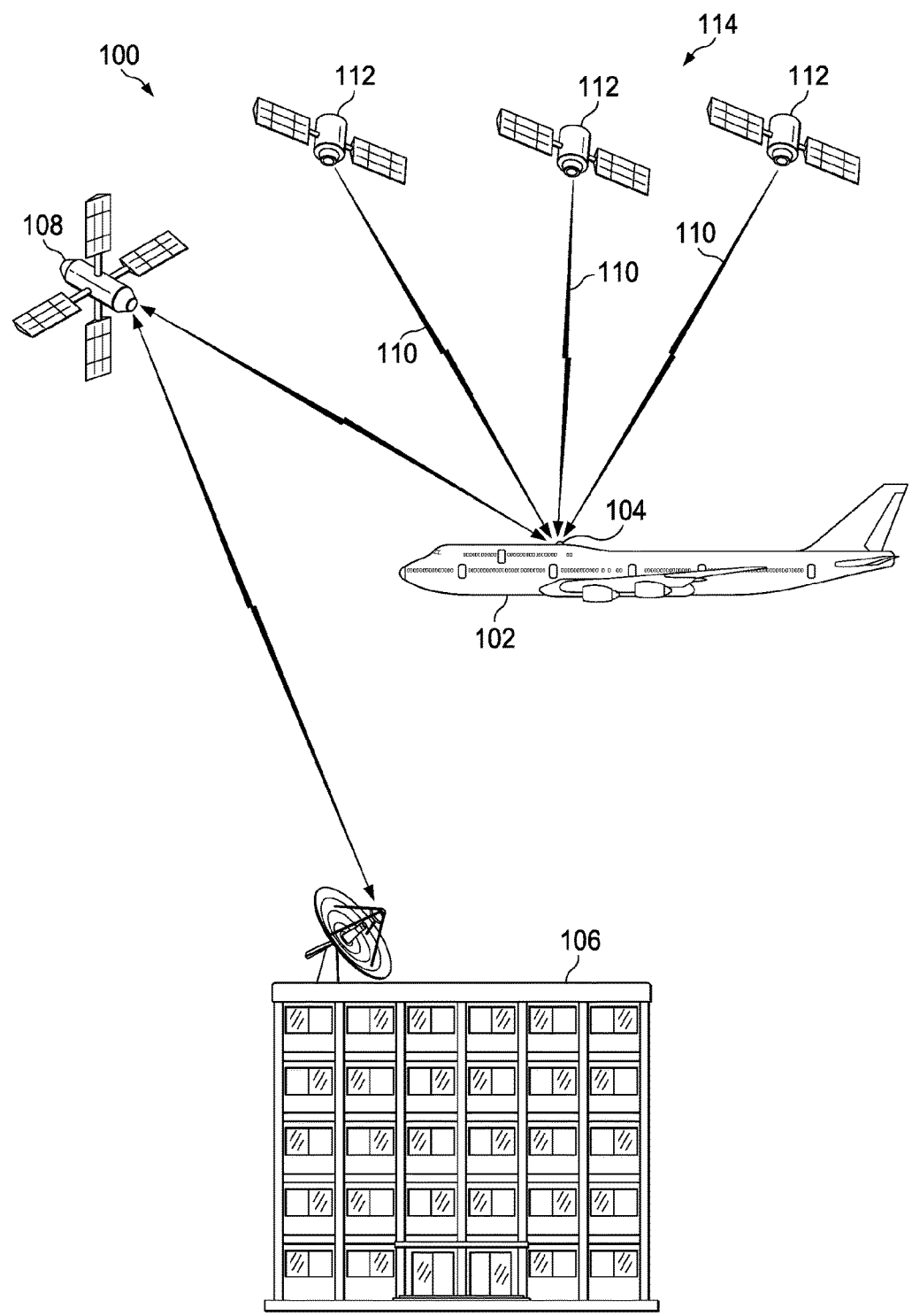
FIG. 1 is an illustration of an aircraft operating environment in accordance with an illustrative embodiment.

The illustrative embodiments recognize and take into account one or more different considerations. For example, the illustrative embodiments recognize and take into account that current aircraft tracking systems such as emergency location transmitters enable a crew member to report a distress situation using a crew interface for an emergency location transmitter in the aircraft. The illustrative embodiments recognize and take into account that the crew interface is often at a switch located on the flight deck of the aircraft or in some other suitable location.

The illustrative embodiments recognize and take into account that this type of interface is subject to tampering. For example, the illustrative embodiments recognize and take into account that someone other than a crew member may turn off the reporting by the emergency locator transmitter. Also, the illustrative embodiments recognize and take into account that someone other than a crew member may disable the switch such that the emergency locator transmitter cannot be turned on to report the distress situation.

The illustrative embodiments recognize and take into account that it would be desirable to have a method and apparatus that reduce the possibility of tampering. For example, the illustrative embodiments provide a method and apparatus for transmitting status information about the aircraft in a manner that reduces concerns with tampering. In one illustrative example, an apparatus comprises an aircraft tracker. The aircraft tracker is configured to identify a state of an aircraft using sensor data received from an aircraft sensor system in an aircraft. The aircraft tracker is also configured to receive a crew command from a crew interface and receive a ground command from a ground source. The aircraft tracker is configured to transmit the state information at a reporting rate set using a state of the aircraft identified from the sensor data and at least one of the crew command or the ground command when at least one of the crew command or the ground command is received. In other words, the aircraft tracker sets the reporting rate using just the aircraft state when the crew command and the ground command are not received.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The aircraft tracking system in the illustrative examples includes a control system that addresses current issues and limitations with current tracker systems. Further, the aircraft tracking system in the list of examples also addresses the requirements common to tracking and distress systems to provide an integrated and comprehensive control solution for an autonomous distress tracker system.

This control system in the aircraft tracking system in the list of examples has a high responsiveness to aircrew distress inputs and ground commands with strong tamperproof functions. The control system integrates multiple external and internal aircraft state data sources and combines these with comprehensive policies to determine high level aircraft states and associated transmission states and reporting rates. The control system provides integrated high level transmit on/off functionality in a tamperproof way to support regulatory requirements and user privacy needs.

With reference now to the figures and, in particular, with reference to FIG. 1, an illustration of an aircraft operating environment is depicted in accordance with an illustrative embodiment. Aircraft operating environment 100 may include any appropriate environment in which aircraft 102 may be operated in any appropriate manner. For example, without limitation, aircraft 102 may be in flight in aircraft operating environment 100.

Aircraft 102 may be any appropriate type of aircraft that may be configured to perform any appropriate operation or mission in aircraft operating environment 100. For example, without limitation, aircraft 102 may be a commercial passenger aircraft, a cargo aircraft, a military aircraft, or any other appropriate type of aircraft. Further, aircraft 102 may be a fixed wing aircraft, a rotary wing aircraft, or a lighter-than-air aircraft. Still further, aircraft 102 may be a manned aircraft or an unmanned aircraft.

In accordance with an illustrative embodiment, aircraft 102 may include tracking device 104. For example, without limitation, tracking device 104 may be attached to the skin of aircraft 102 on the outside of aircraft 102. In accordance with an illustrative embodiment, tracking device 104 may be configured to automatically determine the position of aircraft 102 when aircraft 102 is in flight in aircraft operating environment 100 and to automatically send position information identifying the position of aircraft 102 to receiving station 106 via satellite 108.

Tracking device 104 may be configured to identify the position of aircraft 102 using navigation signals 110 received from a number of navigation system satellites 112 in satellite navigation system 114 in a known manner. As used herein, a "number of," when used with reference to items, means one or more items. For example, a number of navigation system satellites 112 is one or more of navigation system satellites 112.

Tracking device 104 may use navigation signals 110 received from more than three navigation system satellites 112 in satellite navigation system 114 to determine the position of aircraft 102. For example, without limitation, navigation system satellites 112 may include satellites in satellite navigation system 114 such as the Global Positioning System (GPS), the Global Navigation Satellite System (GLONASS), other appropriate satellite navigation systems, or various combinations of satellite navigation systems that may be used by tracking device 104 to determine the position of aircraft 102.

Satellite 108 may comprise any appropriate satellite or plurality of satellites for establishing a communications link between tracking device 104 and receiving station 106 for sending position information identifying the position of aircraft 102 from tracking device 104 to receiving station 106. For example, without limitation, satellite 108 may be a communications satellite in low Earth orbit. A satellite in low Earth orbit is in orbit around the Earth with an altitude between approximately 160 kilometers and 2000 kilometers. For example, without limitation, satellite 108 may be a satellite in the Iridium satellite constellation operated by Iridium Communications. A satellite in the Iridium satellite constellation is referred to herein as an Iridium satellite or an Iridium communications satellite.

Information other than position information may be sent from tracking device 104 on aircraft 102 to receiving station 106 via satellite 108. For example, without limitation, tracking device 104 may be configured to send an alert to receiving station 106 via satellite 108 when aircraft 102 is determined to be in distress. Additionally, instructions for controlling operation of tracking device 104 may be sent from receiving station 106 to tracking device 104 on aircraft 102 via satellite 108. For example, without limitation, instructions for controlling when or how often position information is sent from tracking device 104 may be sent from receiving station 106 to tracking device 104 via satellite 108.

For example, without limitation, receiving station 106 may be located on the ground. Receiving station 106 may be part of or otherwise associated with any appropriate facility or entity that may be associated with the operation of aircraft 102. For example, without limitation, receiving station 106 may be operated by or for an airline that operates aircraft 102. For example, without limitation, receiving station 106 may be part of or associated with a global aircraft tracking system.

Figure 2:
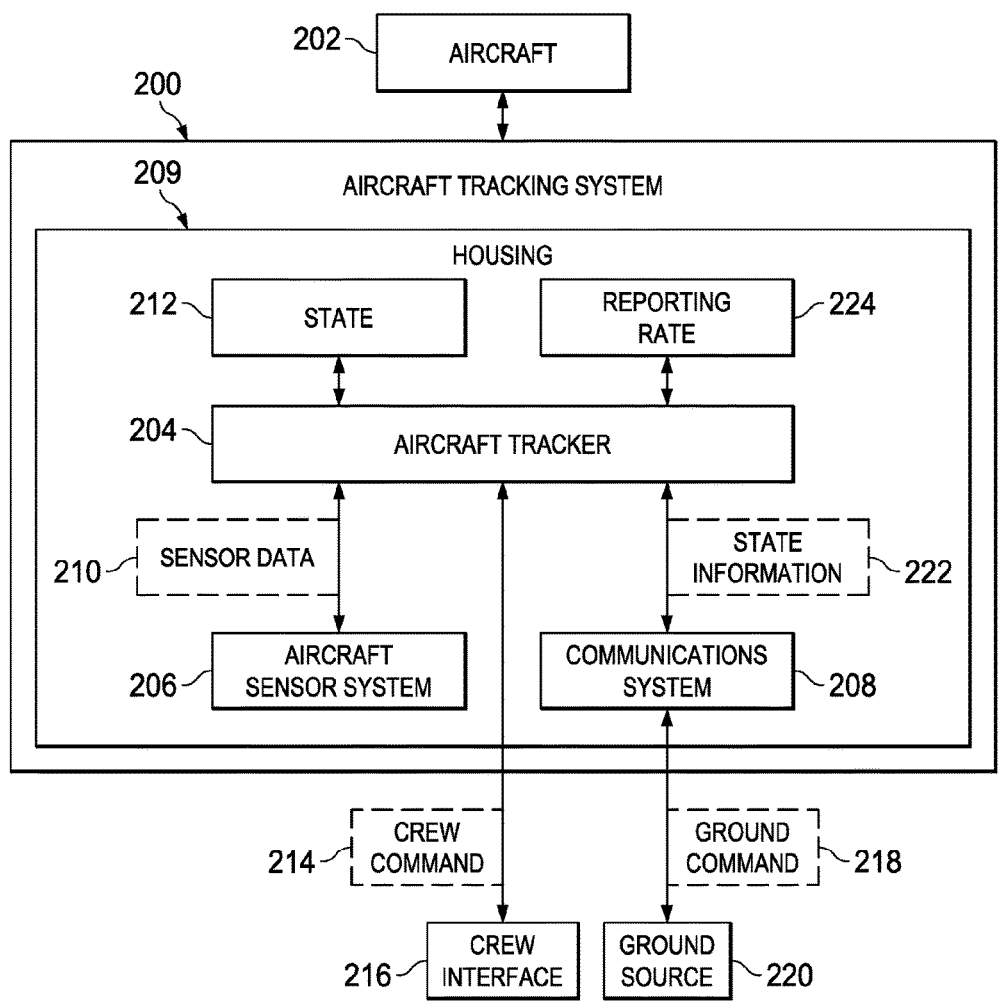
FIG. 2 is an illustration of a block diagram of an aircraft tracking system in accordance with an illustrative embodiment.

With reference now to FIG. 2, an illustration of a block diagram of an aircraft tracking system is depicted in accordance with an illustrative embodiment. Aircraft tracking system 200 is an example of components that may be used in tracking device 104 shown on aircraft 102 in FIG. 1.

As depicted, aircraft tracking system 200 is associated with aircraft 202. When one component is "associated" with another component, the association is a physical association. For example, a first component, aircraft tracking system 200, may be considered to be physically associated with a second component, aircraft 202, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In the illustrative example, aircraft tracking system 200 is comprised of a number of different components. As depicted, aircraft tracking system 200 includes aircraft tracker 204, aircraft sensor system 206, communications system 208, and housing 209.

Aircraft sensor system 206 is a hardware system that includes one or more sensors. Aircraft sensor system 206 generates sensor data 210 about at least one of aircraft 202, the environment inside aircraft 202, or the environment around aircraft 202.

Aircraft sensor system 206 may include one or more sensors selected from at least one of a satellite navigation system, an inertial measurement unit, an accelerometer system, a temperature sensor, a pressure sensor, an airspeed sensor, or other suitable types of sensors. Sensor data 210 may include at least one of a location of aircraft 202, altitude, attitude, power information, a number of parameters for a maneuver performed by aircraft 202, airspeed, roll angle, roll rate, pitch angle, pitch rate, pressure, temperature, fuel use, or other suitable types of data. In the illustrative example, power information may include the amount of power and the source of power. For example, the source of power may be whether power is received from the primary power source, a secondary power source, or an internal battery.

In the illustrative example, communications system 208 is a hardware system. Communications system 208 may include at least one of a satellite communications system, a radio frequency communication system, a high frequency global communication system (HFGCS), a very high frequency (VHF) radio, or some other suitable type of system.

As depicted, aircraft tracker 204 is a control system for aircraft tracking system 200 and may be implemented in software, hardware, firmware, or a combination thereof. When software is used, the operations performed by aircraft tracker 204 may be implemented in program code configured to run on hardware, such as a processor unit. When firmware is used, the operations performed by aircraft tracker 204 may be implemented in program code and data and stored in persistent memory to run on a processor unit. When hardware is employed, the hardware may include circuits that operate to perform the operations in aircraft tracker 204.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

During operation of aircraft 202, aircraft tracker 204 identifies state 212 of aircraft 202. Aircraft tracker 204 identifies state 212 using sensor data 210 received from aircraft sensor system 206 in aircraft 202.

Aircraft tracker 204 receives crew command 214 from crew interface 216. As depicted, crew interface 216 generates crew command 214 and sends crew command 214 to aircraft tracker 204. As depicted, a crew member may operate crew interface 216 to generate crew command 214. Aircraft tracker 204 also receives ground command 218 from ground source 220 through communications system 208. In the illustrative example, ground command 218 may be received using, for example, satellite communications with communications system 208 including a satellite navigation system receiver and one or more antennas.

In the illustrative example, ground command 218 is received in real time. In other words, ground command 218 is sent to aircraft tracking system 200 as quickly as possible without intended delay from ground source 220.

In the illustrative example, crew interface 216 is a physical device and may take a number of different forms. For example, crew interface 216 may be a physical switch in the flight deck, a control displayed on a touchscreen, a part of a multifunction display, or some other suitable type of interface.

In this illustrative example, ground command 218 is received through communications system 208. The communication may be with, for example, receiving station 106 in FIG. 1. The ground command may be sent by an airline, an air traffic controller, or some other suitable entity through receiving station 106.

In the illustrative example, aircraft tracker 204 transmits state information 222 at reporting rate 224 set using state 212 of aircraft 202 identified from sensor data 210 and at least one of crew command 214 or ground command 218 when at least one of crew command 214 or ground command 218 is received. The transmission of state information 222 is performed using communications system 208. In this illustrative example, reporting rate 224 is set autonomously by aircraft tracker 204. In other words, reporting rate 224 may be set automatically based on sensor data 210. This timing may be supplemented by input through crew command 214 and ground command 218. Further, this type of setting of reporting rate 224 may reduce tampering. For example, the ability of a crew to disable reporting by aircraft tracker 204 is limited or eliminated using aircraft tracker 204.

In the illustrative example, housing 209 is a physical structure that holds aircraft tracker 204, aircraft sensor system 206, and communications system 208. Housing 209 is designed to be tamper-resistant. For example, in being tamper-resistant, housing 209 is designed to prevent or reduce an ability of an unauthorized person to access or control aircraft tracker 204, aircraft sensor system 206, and communications system 208. Additionally, housing 209 may also be resistant to the environment around the aircraft 202.

In one illustrative example, one or more technical solutions are present that overcome a technical problem with tampering with emergency locator transmitters. One or more technical solutions are also present that overcome a technical problem with autonomy in reporting state information 222 for aircraft 202. Aircraft tracker 204 manages reporting of state information 222 based on the source of commands received by aircraft tracker 204 and state 212 identified for aircraft 202. Increased autonomy is present in which aircraft tracker 204 reports state information 222 and with a desired level of autonomy. For example, aircraft tracker 204 sets reporting rate 224 for state information 222 regardless of whether crew command 214 or ground command 218 is received. Further, the amount of influence that crew command 214 or ground command 218 may have on reporting rate 224 is controlled by aircraft tracker 204. In other words, aircraft tracker 204 may be configured to reduce tampering that may occur through crew command 214 and ground command 218.

As a result, one or more technical solutions may provide a technical effect in which more accurate tracking of aircraft 202 occurs during operation of aircraft 202. Further, inadvertent or purposeful, turning off reporting of state information 222 may be prevented using aircraft tracker 204 in aircraft tracking system 200. Reporting rate 224 may be set to provide desired information about aircraft 202 in various situations. This reporting may include obtaining state information 222 for maintenance purposes.

Figure 3:
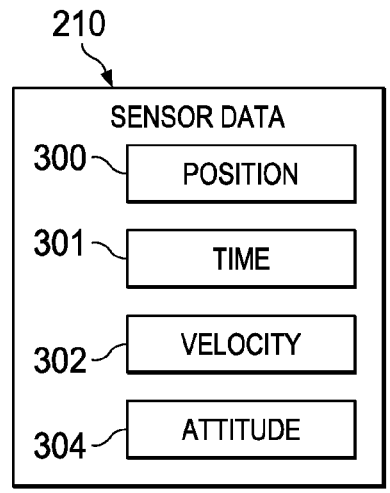
FIG. 3 is an illustration of a block diagram of sensor data in accordance with an illustrative embodiment.

With reference now to FIG. 3, an illustration of a block diagram of sensor data is depicted in accordance with an illustrative embodiment. In the illustrative examples, the same reference numeral may be used in more than one figure. This reuse of a reference numeral in different figures represents the same element in the different figures.

In this illustrative example, sensor data 210 is generated by aircraft sensor system 206 located in aircraft tracking system 200 inside housing 209 as shown in FIG. 2. In other words, sensor data 210 is generated internally within aircraft tracking system 200.

Sensor data 210 includes a number of parameters. For example, sensor data 210 includes position 300, time 301, velocity 302, and attitude 304.

Position 300 includes latitude and longitude of aircraft 202. Further, position 300 also includes the altitude of aircraft 202. Position 300 also may include aircraft track information including the direction of travel of aircraft 202.

Time 301 may be obtained through signals received by satellite navigation system receivers, such as a global positioning system (GPS) receiver and a global navigation satellite system (GLONASS) receiver. Time 301 may be used to identify rates or other information.

Velocity 302 identifies the speed at which aircraft 202 travels. Velocity 302 may include a lateral velocity, a vertical velocity, or both a lateral velocity and a vertical velocity.

As depicted, attitude 304 includes an identification of the pitch and the roll of aircraft 202. Further, attitude 304 also may include the pitch rate and the roll rate. Attitude 304 also may include an identification of the yaw rate.

In other illustrative examples, sensor data 210 may include other parameters in addition to or in place of the ones depicted in FIG. 3. The parameters selected for sensor data 210 may be any parameters that identify the position, trajectory, and attitude of aircraft 202.

Figure 4:
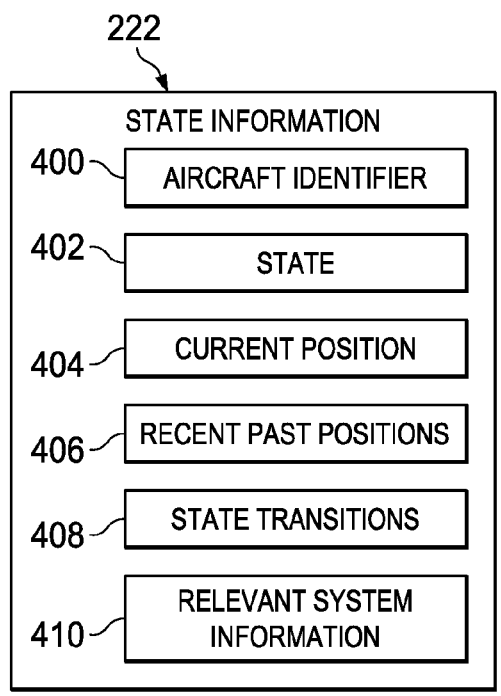
FIG. 4 is an illustration of a block diagram of state information in accordance with an illustrative embodiment.

With reference now to FIG. 4, an illustration of a block diagram of state information is depicted in accordance with an illustrative embodiment. In this illustrative example, state information 222 is generated by aircraft tracker 204 to report information about aircraft 202 as shown in FIG. 2. As depicted, state information 222 includes aircraft identifier 400, state 402, current position 404, recent past positions 406, state transitions 408, and relevant system information 410.

Aircraft identifier 400 identifies aircraft 202 for which state information 222 is transmitted. Aircraft identifier 400 may take different forms. For example, aircraft identifier 400 may be a tail number or some other unique identifier.

In the illustrative example, current position 404 is the current position of aircraft 202. Current position 404 includes latitude, longitude, and altitude.

Recent past positions 406 are positions of aircraft 202. The positions may be over a period of time or distance. For example, recent past positions 406 may be positions of aircraft 202 for the last 20 minutes.

State transitions 408 are transitions for aircraft 202. State transitions 408 may identify changes in state 212 of aircraft 202. State transitions 408 may be, for example, normal 50 minutes; abnormal 8 minutes; and normal 2 hours. State transitions 408 also may indicate that no changes in state 212 occurred.

Relevant system information 410 is information about one or more systems in aircraft 202. The information included in relevant system information 410 may depend on at least one of state 402 or state transitions 408. Relevant system information 410 may include at least one of the state of an aircraft system, parameters from an aircraft system, or other suitable information.

Figure 5:
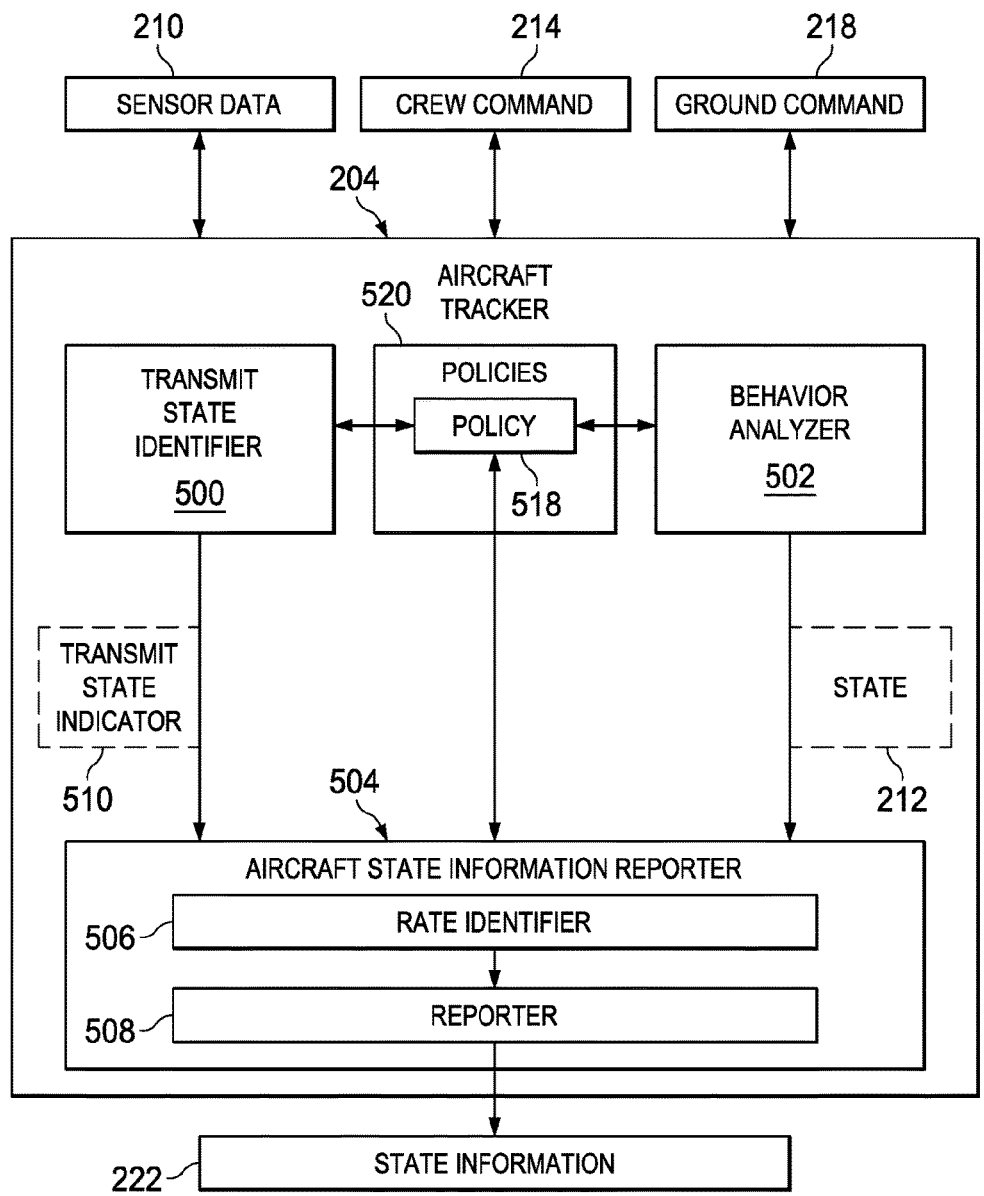
FIG. 5 is an illustration of a block diagram of an aircraft tracker in accordance with an illustrative embodiment.

Turning next to FIG. 5, an illustration of a block diagram of an aircraft tracker is depicted in accordance with an illustrative embodiment. As depicted, one implementation of aircraft tracker 204 includes transmit state identifier 500, behavior analyzer 502, and aircraft state information reporter 504.

As depicted, one or more of these components in aircraft tracker 204 receives sensor data 210, crew command 214, and ground command 218 as inputs. Based on these inputs, the components operate to generate state information 222.

Transmit state identifier 500 indicates whether state information 222 should be transmitted. Transmit state identifier 500 generates transmit state indicator 510. In this illustrative example, transmit state indicator 510 is sent to aircraft state information reporter 504. Transmit state indicator 510 may be, for example, "transmit on" when a transmission should occur and "transmit off" when a transmission should not occur.

In some instances, the transmission of state information 222 may be undesirable. For example, in some locations, the laws of a particular country may prohibit transmitting state information 222 by aircraft 202.

In this example, transmit state identifier 500 may use sensor data 210 to identify when geographic locations may restrict when state information 222 may be sent as part of the process for generating transmit state indicator 510. Further, transmitting state information 222 may also be undesirable for detectability reasons when aircraft 202 is in flight. The transmission may be turned off by crew command 214, ground command 218, or some combination thereof. Thus, transmit state identifier 500 may generate transmit state indicator 510 based on at least one of crew command 214 or ground command 218. Priorities between crew command 214 or ground command 218 when both are present is defined using policy 518.

In the illustrative example, behavior analyzer 502 identifies state 212 of aircraft 202 using sensor data 210 and policy 518. In this example, policy 518 defines states of aircraft 202 based on sensor data 210. Policy 518 includes rules that are applied to sensor data 210 to identify state 212 of aircraft 202. State 212 is sent to aircraft state information reporter 504.

Aircraft state information reporter 504 transmits state information 222 at reporting rate 224, shown in FIG. 2, set using state 212 of aircraft 202 identified from sensor data 210 and at least one of crew command 214 or ground command 218 when at least one of crew command 214 or ground command 218 is received. In other words, reporting rate 224 is set using a combination of state 212 and crew command 214 and ground command 218 when either or both of those commands have been received for use in setting reporting rate 224. In this manner, aircraft tracker 204 may operate with autonomy in reporting state information 222 with some influences by the crew through crew command 214 and the ground through ground command 218.

Aircraft state information reporter 504 also may identify state information 222 for transmission. In the illustrative example, state information 222 is identified from sensor data 210. As depicted, state information 222 includes at least one of sensor data 210 or information derived from sensor data 210. For example, state information 222 may include state 212 identified from sensor data 210.

As depicted, aircraft state information reporter 504 handles setting reporting rate 224 using crew command 214 or ground command 218 using policy 518 along with state 212. For example, aircraft state information reporter 504 in aircraft tracker 204 transmits state information 222 at reporting rate 224 set using state 212 of aircraft 202 identified from sensor data 210 and at least one of crew command 214 or ground command 218 with state 212 using policy 518. In this example, policy 518 defines priorities for reporting that are based on at least one of crew command 214, ground command 218, or state 212 identified by behavior analyzer 502.

With policy 518, aircraft tracker 204 may set reporting rate 224 for state information 222 in autonomously. Increased autonomy is present in which aircraft tracker 204 reports state information 222 and with a desired level of autonomy using policy 518. For example, the amount of influence that crew command 214 or ground command 218 may have on reporting rate 224 is controlled by policy 518 in aircraft tracker 204. In other words, aircraft tracker 204 may be configured to reduce tampering that may occur through crew command 214 and ground command 218 using policy 518.

For example, policy 518 may set priorities for aircraft tracker 204, crew command 214, and ground command 218. In one example, the priorities set in policy 518 from highest to lowest in aircraft tracker 204, crew command 214, and ground command 218. If aircraft tracker 204 identifies a distress state, then crew command 214, and ground command 218 cannot change reporting rate 224. In this example, if crew command 214 indicates an "abnormal" state, crew command 214 may be sent again to change the state back to normal. If, however, aircraft tracker 204 changes reporting rate 224 by identifying a distress state, crew command 214 cannot change the rate by sending a command indicating a normal state.

In other examples, policy 518 may set different priorities. The priorities may change depending on what caused the state change. The cause may be identified from at least one of sensor data 210, crew command 214, or ground command 218.

In this illustrative example, aircraft state information reporter 504 includes rate identifier 506 and reporter 508. Rate identifier 506 identifies reporting rate 224 using state 212 of aircraft 202 identified from sensor data 210 and at least one of crew command 214 or ground command 218 when at least one of crew command 214 or ground command 218 is received. Reporter 508 identifies state information 222 for transmission and transmits state information 222 at reporting rate 224 identified by rate identifier 506 when transmit state identifier 500 indicates that state information 222 should be transmitted. In some illustrative examples, overrides may be included to allow reporting of state information 222 even when transmit state identifier 500 indicates that state information 222 is not to be reported.

As depicted in FIG. 5, policy 518 is part of policies 520. Policy 518 may be a default policy or may be selected from policies 520 based on a selection received from ground command 218. Policies 520 may be uploaded to aircraft tracking system 200 from ground source 220 or may be already present in aircraft tracking system 200.

In this manner, aircraft tracker 204 is reconfigurable by changing policy 518 to another policy in policies 520. For example, policy 518 may be selected based on at least one of the geographic location for a flight, a mission, changes in regulations, or other suitable reasons. The reconfiguration may occur before flight, during maintenance, during flight, or during some other time.

Figure 6:
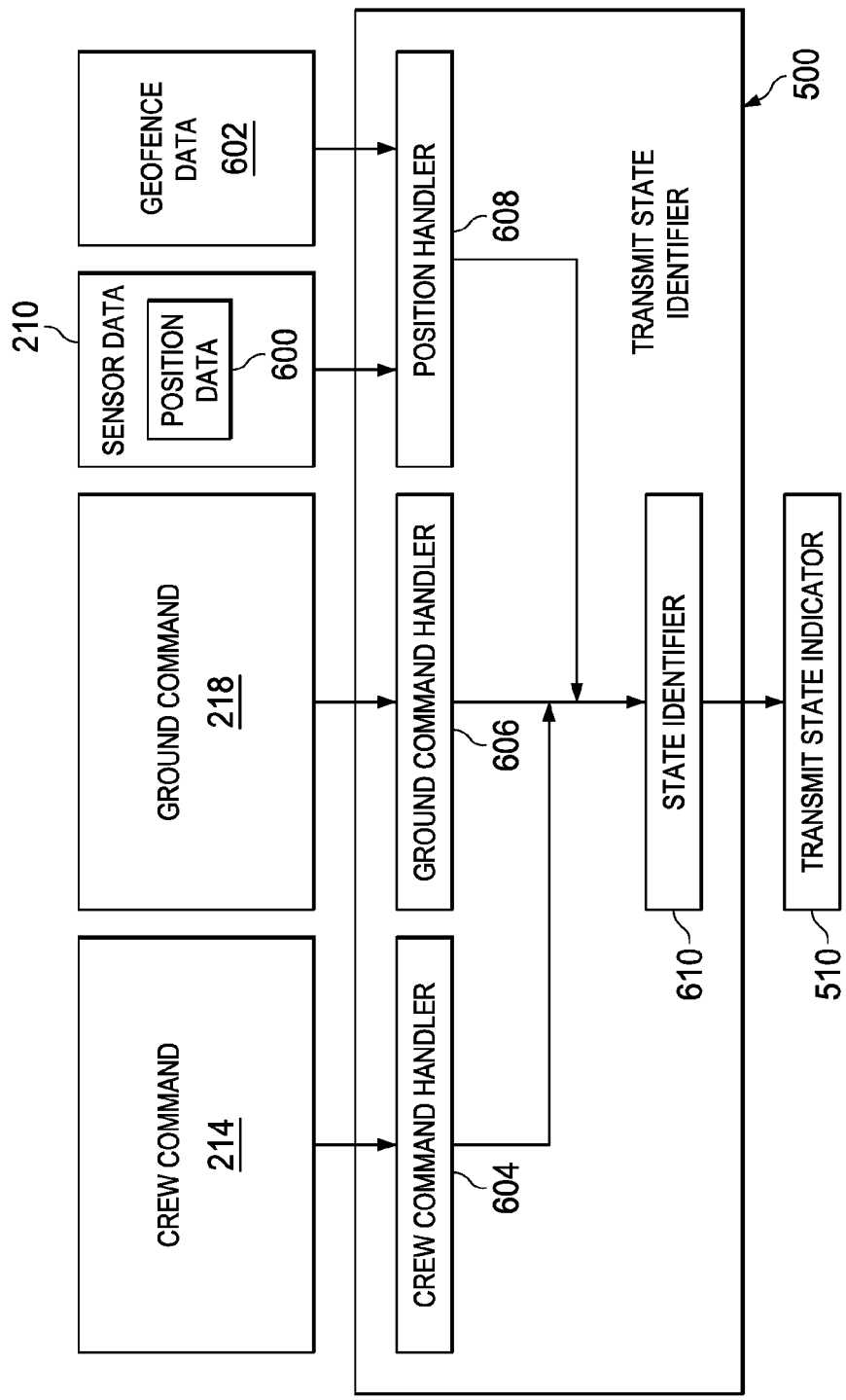
FIG. 6 is an illustration of a block diagram of data flow for a transmit state identifier that identifies the state of an aircraft in accordance with an illustrative embodiment.

With reference now to FIG. 6, an illustration of a block diagram of data flow for a transmit state identifier that identifies the state of an aircraft is depicted in accordance with an illustrative embodiment. In this illustrative example, transmit state identifier 500 receives crew command 214, ground command 218, position data 600, and geofence data 602 as inputs and generates transmit state indicator 510 as an output.

As depicted, transmit state identifier 500 includes a number of different components. In the illustrative example, transmit state identifier 500 includes crew command handler 604, ground command handler 606, position handler 608, and state identifier 610.

In this illustrative example, crew command 214 may indicate whether aircraft tracker 204 should transmit state information 222. As depicted, crew command handler 604 monitors for crew command 214 from crew interface 216 as shown in FIG. 2. Crew command handler 604 outputs "transmit on" if crew command 214 indicates that transmission should occur. Crew command handler 604 outputs "no-request" if crew command 214 is not received from crew interface 216.

As depicted, ground command handler 606 outputs "transmit on" in response to receiving ground command 218 that state information 222 should be transmitted. Ground command handler 606 outputs "transmit off" in response to receiving ground command 218 indicating that state information 222 should not be transmitted. In a similar fashion, if ground command 218 is not received, ground command handler 606 outputs "no request."

Position handler 608 uses position data 600 and geofence data 602 to determine whether aircraft tracker 204 should transmit state information 222 based on the location of aircraft 202. Position handler 608 outputs "transmit off" or "transmit on" to indicate whether state information 222 should be transmitted to position data 600 and geofence data 602. If either position data 600 or geofence data 602 is absent, position handler 608 outputs "no request."

As depicted, position data 600 is the position of aircraft 202. Geofence data 602 is obtained from policy 518 in this example and defines positions where aircraft tracker 204 should not transmit state information 222. Geofence data 602 may define a volume or an area. For example, Geofence data 602 may include coordinates in the form of latitudes, longitudes, and altitudes to define a volume in which transmission of state information 222 should not occur. State identifier 610 generates transmit state indicator 510 based on receiving input from crew command handler 604, ground command handler 606, and position handler 608.

With reference next to FIG. 7, an illustration of a table identifying whether state information should be transmitted in which a flight crew command is given the highest priority is depicted in accordance with an illustrative embodiment. In this illustrative example, table 700 may be implemented in policy 518 in FIG. 5. Table 700 indicates when state information 222 should be transmitted. The requested states include "transmit on", "transmit off", "any", or "no request". As depicted, "any" may be either "transmit on" or "transmit off."

In this illustrative example, row 702 identifies states for transmit state indicator 510, row 704 depicts the outputs from crew command handler 604, row 706 illustrates outputs for ground command handler 606, and row 708 shows outputs for position handler 608. As depicted, column 710, column 712, and column 714 indicate when transmit state indicator 510 is "transmit on" based on inputs from crew command handler 604, ground command handler 606, and position handler 608. Column 716 and column 718 indicate when transmit state indicator 510 is "transmit off" based on inputs from crew command handler 604, ground command handler 606, and position handler 608.

Figure 8:
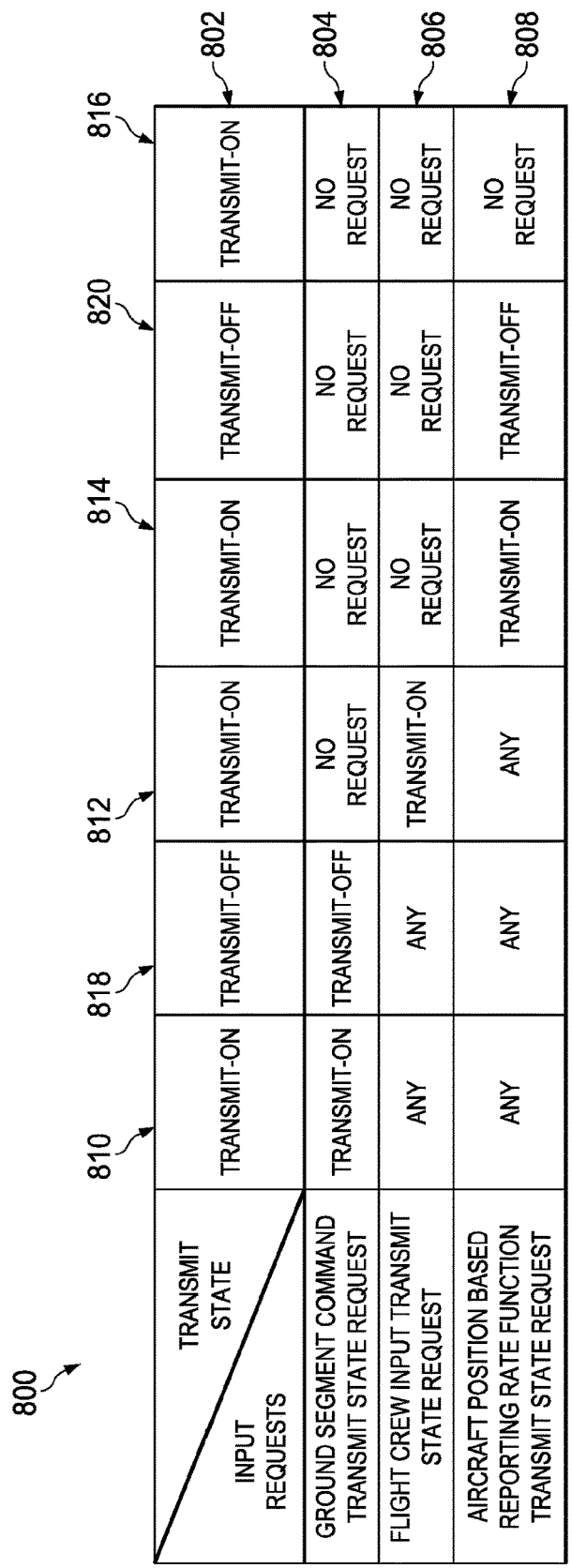
FIG. 8 is an illustration of a table identifying whether state information should be transmitted in which a ground command is given the highest priority in accordance with an illustrative embodiment.

With reference next to FIG. 8, an illustration of a table identifying whether state information should be transmitted in which a ground command is given the highest priority is depicted in accordance with an illustrative embodiment. In this illustrative example, table 800 may be implemented in policy 518 in FIG. 5. Table 800 indicates when state information 222 should be transmitted. The requested states include "transmit on," "transmit off," "any," or "no request." As depicted, "any" may be either "transmit on" or "transmit off."

In this illustrative example, row 802 identifies states for transmit state indicator 510, row 804 illustrates outputs for ground command handler 606, row 806 depicts the outputs from crew command handler 604, and row 808 shows outputs for position handler 608. As depicted, column 810, column 812, column 814 and column 816 indicate when transmit state indicator 510 is "transmit on" based on inputs from crew command handler 604, ground command handler 606, and position handler 608. Column 818 and column 820 indicate when transmit state indicator 510 is "transmit off" based on inputs from crew command handler 604, ground command handler 606, and position handler 608.

In the depicted examples in table 700 in FIG. 7 and table 800 in FIG. 8, the flight crew command is limited to "transmit on" or "no-request" to reflect a tamper-proof implementation. For example, crew cannot turn off the transmit capability using the policy implemented with these tables. In another illustrative example, transmit state control policy may also allow the crew to select the "transmit off" state as well as the "transmit on" state.

Figure 9:
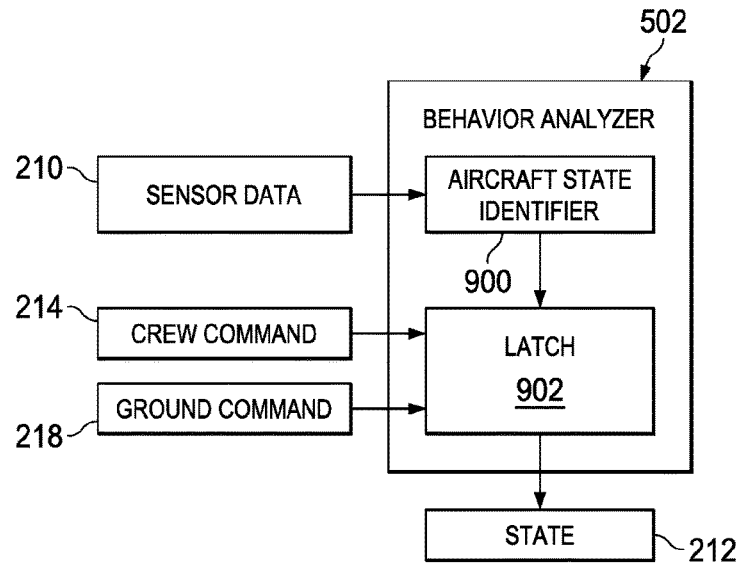
FIG. 9 is an illustration of a block diagram of data flow for a behavior analyzer identifying a state of an aircraft in accordance with an illustrative embodiment.

With reference to FIG. 9, an illustration of a block diagram of data flow for a behavior analyzer identifying a state of an aircraft is depicted in accordance with an illustrative embodiment. Behavior analyzer 502 receives sensor data 210 as an input and outputs state 212.

In this illustrative example, behavior analyzer 502 includes a number of components. As depicted, behavior analyzer 502 includes aircraft state identifier 900 and latch 902.

As depicted, aircraft state identifier 900 identifies state 212 of aircraft 202 using sensor data 210 as inputs. Based on these inputs, aircraft state identifier 900 outputs state 212. In the illustrative examples, sensor data 210 also may include power information for power received by aircraft tracker 204.

In the illustrative example, sensor data 210 may be compared to policy 518 shown in FIG. 5 by aircraft state identifier 900 in identifying state 212. As depicted, state 212 may be selected from a group of states comprising normal, abnormal, and distressed. As depicted, policy 518 may specify parameters in sensor data 210 for aircraft behavior that is considered normal, abnormal, or distressed in identifying state 212.

These parameters may take the form of thresholds or other values. The parameters may include, for example, roll, roll rate, pitch, pitch rate, cabin pressure, velocity, temperature, and other suitable parameters. Policy 518 includes rules and data that may be used to identify abnormal states and distress states.

In this illustrative example, latch 902 receives state 212 from aircraft state identifier 900 and outputs state 212 to aircraft state information reporter 504 in FIG. 5. In the illustrative example, latch 902 maintains the same state 212 even though state 212 as output by aircraft state identifier 900 may change. For example, if state 212 changes from normal to abnormal and then back to normal, latch 902 continues to output abnormal. Latch 902 continues to output the worst state identified for aircraft 202.

For example, if state 212 identified by aircraft state identifier 900 changes from normal to distress and then to abnormal, latch 902 continues to output distress. In the illustrative example, the hierarchy of states is distress, abnormal, and normal, with distress being the highest and normal being the lowest.

In the illustrative example, at least one of crew command 214 or ground command 218 may be used to reset latch 902. When latch 902 is reset, latch 902 outputs the state received from aircraft state identifier 900 at the time of the reset. The priorities in resetting latch 902 between crew command 214 and ground command 218 may be specified by policy 518. In another example, latch 902 also may reset after a selected period of time passes. In another illustrative example, crew command 214 may not be used to reset latch 902. This option may be selected depending on issues with tampering. By not using crew command 214, possibility of tampering may be reduced. However, when crew command 214 is used, the policy may be implemented to limit the ability to reset latch 902.

Figure 10:
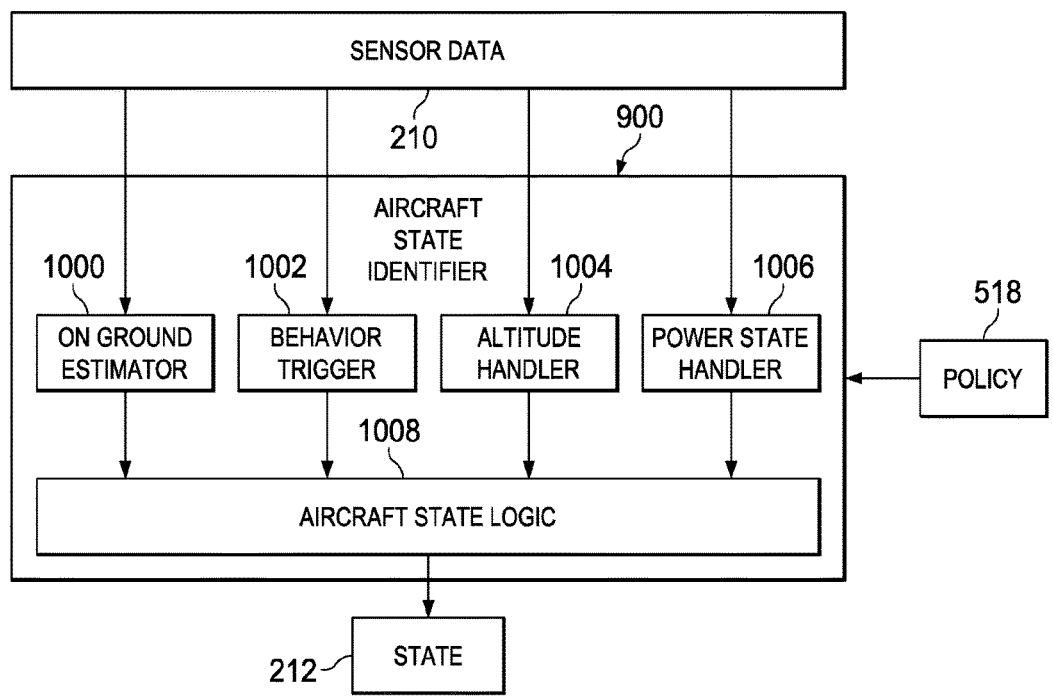
FIG. 10 is an illustration of a block diagram of an aircraft state identifier in accordance with an illustrative embodiment.

With reference next to FIG. 10, an illustration of a block diagram of an aircraft state identifier is depicted in accordance with an illustrative embodiment. As depicted, aircraft state identifier 900 includes on ground estimator 1000, behavior trigger 1002, altitude handler 1004, power state handler 1006, and aircraft state logic 1008.

As depicted, on ground estimator 1000 determines whether aircraft 202 is on the ground. In the illustrative example, if aircraft 202 is on the ground, reporting of state information 222 by aircraft tracker 204 is unnecessary in the depicted example.

On ground estimator 1000 outputs "on ground" when a determination is made that aircraft 202 is on the ground using sensor data 210. Sensor data 210 used by on ground estimator 1000 includes, for example, altitude, ground speed, vertical speed, and other parameters that may be derived using aircraft sensor system 206. Additionally, if access to the avionics in aircraft 202 is present, on ground estimator 1000 may also use parameters, such as, for example, a configuration of landing gear, airspeed, altitude, cabin pressurization, and other suitable information that may be obtained from at least one of aircraft sensor system 206 and avionics in aircraft 202.

Behavior trigger 1002 outputs "normal," "abnormal," or "distress" using sensor data 210. Behavior trigger 1002 employs rules in policy 518. These rules include, for example, trigger conditions that may indicate a state of "abnormal" or "distress."

For example, abnormal states may be present when selected trigger conditions for abnormal states are met. For example, trigger conditions may be a roll that is greater than a threshold value. In another example, trigger conditions may be a pitching aircraft that is greater than a threshold value at a particular altitude. These and other trigger conditions are used to identify state 212 of aircraft 202.

Altitude handler 1004 indicates a state of aircraft 202 based on the altitude of aircraft 202. For example, altitude handler 1004 may indicate a "normal" state if the aircraft is within a desired altitude. If the aircraft is lower or higher than the desired altitude, then altitude handler 1004 may indicate an "abnormal" or "distress" state.

In the illustrative example, altitude handler 1004 may set the minimum and maximum altitudes for indicating an "abnormal" or "distress" state by the means of geographic boundaries. These geographic boundaries form geofences. For example, the geographic boundaries may provide different minimum and maximum altitude thresholds for oceanic or enroute flight phases and for flight phases taking place closer to the departure and destination locations.

In the illustrative example, power state handler 1006 receives power information in sensor data 210. Power state handler 1006 outputs "normal," "abnormal," or "distress" with respect to the power received by aircraft tracker 204.

For example, the power state is indicated as "distress" if power information indicates the transition from power on to power off while on ground estimator 1000 indicates that aircraft 202 is airborne. As another example, power state handler 1006 indicates that the power state is "abnormal" if power is received from a secondary power source while aircraft 202 is indicated as being airborne by on ground estimator 1000.

With reference next to FIGS. 11-15, an illustration of tables for trigger conditions and identifying states in a policy is depicted in accordance with an illustrative embodiment. As depicted in FIG. 11, an illustration of a table of trigger conditions for excessive banking is depicted in accordance with an illustrative embodiment. Table 1100 may be used by behavior trigger 1002 in FIG. 10 and illustrates trigger conditions roll in column 1102. Column 1104 indicates persistence time. In other words, if the trigger conditions are present for more than the time indicated in column 1104, then the condition is triggered. The default value for the time is an example default value.

Column 1106 indicates types of positions for geo-fencing. For example, inside reporting region 1108 itself may be an oceanic or remote region. Outside reporting region 1110 may be a region such as one in which air traffic control tracking radar coverage is present.

Column 1112 indicates altitudes for parameters values in column 1114. The parameter values in column 1114 are for parameters in the trigger conditions in column 1102. Column 1116 identifies the state. These values are example default values.

With reference to FIG. 12, an illustration of a table of trigger conditions for excessive pitch is depicted in accordance with an illustrative embodiment. Table 1200 may be used by behavior trigger 1002 in FIG. 10 and illustrates trigger conditions for pitch by aircraft 202 in column 1202. Column 1204 indicates persistence time. Column 1206 indicates types of positions for geo-fencing. Column 1212 indicates altitudes for parameters values in column 1214. The parameter values are for parameters in the trigger conditions in column 1202. Column 1216 identifies the state.

Turning next to FIG. 13, an illustration of a table of trigger conditions for excessive speed is depicted in accordance with an illustrative embodiment. Table 1300 may be used by behavior trigger 1002 in FIG. 10 and illustrates trigger conditions for horizontal speed and vertical speed by aircraft 202 in column 1302. Column 1304 indicates persistence time. Column 1306 indicates types of positions for geo-fencing. Column 1312 indicates altitudes for parameters values for horizontal and vertical speed in column 1314. The parameter values are for parameters in the trigger conditions in column 1302. Column 1316 identifies the state.

In FIG. 14, an illustration of a table of states for altitudes is depicted in accordance with an illustrative embodiment. Table 1400 may be used by altitude handler 1004 in FIG. 10 and illustrates altitudes and states. Column 1404 indicates persistence time. Column 1406 indicates types of positions for geo-fencing. Column 1412 indicates altitudes, and column 1416 identifies the state based on the altitudes in column 1412.

With reference next to FIG. 15, an illustration of a table of trigger conditions for track changes is depicted in accordance with an illustrative embodiment. Table 1500 may be used by behavior trigger 1002 in FIG. 10 and illustrates trigger conditions for change in the track for aircraft 202 in column 1502. Column 1504 indicates persistence time. Column 1506 indicates types of positions for geo-fencing. Column 1512 indicates altitudes for parameters values for track changes in column 1514. The parameter values in column 1514 are for parameters in the trigger conditions in column 1502. Column 1516 identifies the state.

Figure 16:
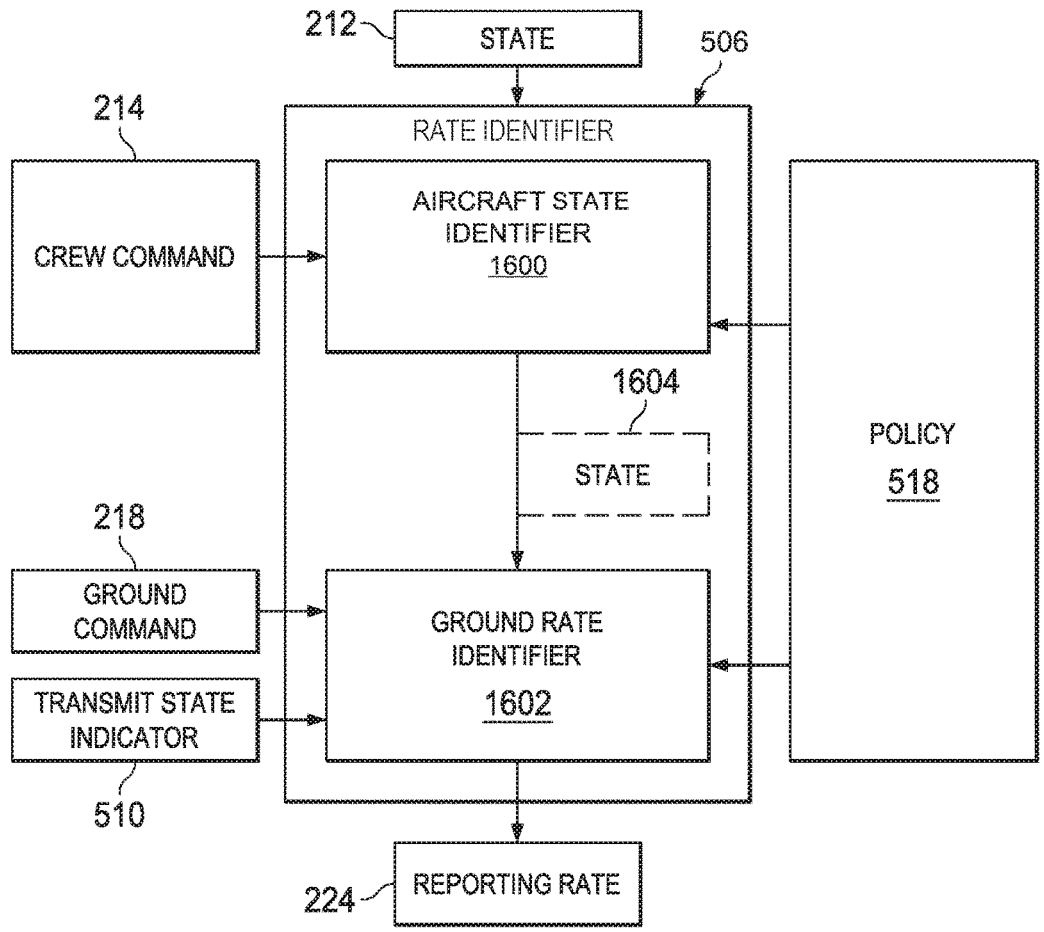
FIG. 16 is an illustration of a block diagram of a rate identifier in accordance with an illustrative embodiment.

Turning next to FIG. 16, an illustration of a block diagram of a rate identifier is depicted in accordance with an illustrative embodiment. In this illustrative example, an implementation for rate identifier 506 in FIG. 5 is shown. As depicted, rate identifier 506 includes aircraft state identifier 1600 and ground rate identifier 1602.

As depicted, aircraft state identifier 1600 selects state 1604 from state 212 in FIG. 2 identified by behavior analyzer 502 and the state identified from crew command 214. In other words, a state is identified from states that may be output by at least one of behavior analyzer 502 and crew command 214.

Additional functions may be implemented in aircraft state identifier 1600 to determine state 1604. In one illustrative example, geographically based reporting rate settings may be used. The settings may define aircraft position and transmit rate settings associated with pre-defined geographic areas or volumes in the form of geofences. The geographic areas may be defined using latitude and longitude. The volumes may include latitude, longitude, and altitude.

These aircraft position based rate inputs can be used to set non-distress reporting states and abnormal reporting states to lower or higher values, depending on the availability of alternative aircraft tracking data sources. The lower and higher values for reporting rates may include report-off, a standby state, or a normal state. Availability of aircraft tracking data sources may take into account air traffic control surveillance radar coverage.

These types of settings may be used to reduce communications resource usage and hence, system operating costs. In this illustrative example, state 1604 output by aircraft state identifier 1600 may be determined by the combination of the settings of the aircraft state identifier 900, the crew command 214 and this aircraft position based reporting function using prioritizations set by policy 518.

In the illustrative example, a priority between differing states may be defined by policy 518 in FIG. 5. Policy 518 indicates a state is output as state 1604 by aircraft state identifier 1600 when state 212 output by behavior analyzer 502, the state in crew command 214, and other aircraft rate identifier functions are not the same. Policy 518 may be set to prioritize between these inputs with the inputs being treated as equal in priority, such that the highest requested state sets the aircraft state. Alternatively, policy 518 may be set to prioritize one set of inputs over the others.

For example, a priority may be, from highest to lowest, as follows: "distress," "report off," "abnormal," "normal," "standby," and "no request." If behavior analyzer 502 outputs state 212 as "normal" and crew command 214 indicates "abnormal," then "abnormal" by crew command 214 is output in state 1604 by aircraft state identifier 1600. The output is sent to ground rate identifier 1602.

Ground rate identifier 1602 identifies reporting rate 224 based on state 1604 output by at least one of aircraft rate identifier 1600 or the state in crew command 214. Priorities of states between state 1604 and the state in ground command 218 may be identified in a similar fashion as described, with respect to aircraft state identifier 1600 when state 1604 and the state in ground command 218 are not same. The state is used to identify reporting rate 224 in the illustrative example.

In the illustrative example, ground rate identifier 1602 also uses transmit state indicator 510 to determine whether any transmissions of state information 222 should occur. If transmit state indicator 510 is "transmit on," then ground rate identifier 1602 causes reporter 508 in FIG. 5 to transmit state information at a rate in reporting rate 224. If transmit state indicator 510 is "transmit off," then ground rate identifier 1602 causes reporter 508 to not transmit state information 222 by setting reporting rate 224 to zero.

In one illustrative example, ground rate identifier 1602 and policy 518 may determine reporting rate 224 using rules in policy 518 that are configured to treat all the rate inputs, including aircraft state identifier 1600, state 1604 input, and ground command 218, as equal priority. With this example, the highest reporting state is selected to be output as reporting rate 224.

Another illustrative example, ground rate identifier 1602 and policy 518 may determine reporting rate 224 using rules in policy 518 that are configured to treat one source as the high-priority input and use this input, unless the input is "no-request" for reporting rate 224. The source may be, for example, ground command 218. In the situation in which the high priority input has an input of "no-request," the other inputs are treated as equal in priority, such that the highest requested rate sets reporting rate 224.

In yet another illustrative example, ground rate identifier 1602 and policy 518 may determine reporting rate 224 using rules in policy 518 that are configured to treat one source as the high priority input for non-distress states or non-distress and non-abnormal states. This input is used unless the input is "no-request" for reporting rate 224 when inputs of abnormal state or distress state are absent. In the depicted example, the high-priority input may be, for example, ground command 218.

When high priority input has an input of "no-request", then in non-distress and non-abnormal cases, the other inputs are treated as equal in priority such that the highest requested rate sets reporting rate 224. When an "abnormal" or "distress" is present in one or more of the inputs, the highest requested rate by the inputs is used to set reporting rate 224 or the value of the prioritized input (if an input other than "no-request) is present, may be used to set reporting rate 224.

In still yet another illustrative example, policy 518 may include rules and the parameters that define at least one of thresholds, persistence and hysteresis times, geofences for transmit state, and rate settings. For example, policy 518 also may include geographic definitions for minimum and maximum safe altitudes in transmit state identifier 500, aircraft state identifier 900, and aircraft state identifier 1600.

Policy 518 also may include rules that are used to set the reporting rates output by ground rate identifier 1602 and by reporter 508. As depicted, policy 518 may define default settings that are built into the system.

These settings may be updated by the loading of new data using configuration table inputs, such as the tables shown in FIGS. 7-8 and FIGS. 11-14. The new data may supersede the default values for long term operations or by ground commands that provide real-time updates that may be valid over a shorter period.

Figure 17:
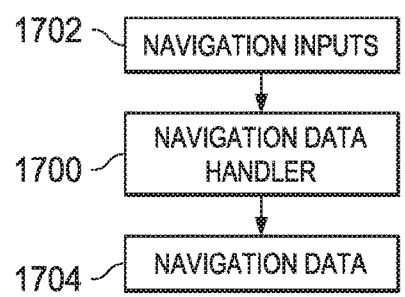
FIG. 17 is an illustration of a block diagram of a navigation data handler in accordance with an illustrative embodiment.

With reference now to FIG. 17, an illustration of a block diagram of a navigation data handler is depicted in accordance with an illustrative embodiment. In this illustrative example, navigation data handler 1700 receives navigation inputs 1702 from aircraft sensor system 206 and avionics in aircraft 202. Navigation inputs 1702 are a portion of sensor data 210 in FIG. 2.

For example, aircraft sensor system 206 may include one or more satellite navigation system receivers, such as a global positioning system (GPS) receiver and a global navigation satellite system (GLONASS) receiver. Inputs are received from the avionics in aircraft 202 such as an aircraft inertial navigation system.

Navigation data handler 1700 processes navigation inputs 1702 and outputs navigation data 1704. In processing the sensor data, navigation data handler 1700 may identify which inputs include navigation data 1704. For example, navigation data handler 1700 may determine which inputs in navigation inputs 1702 have valid data. As depicted, navigation data 1704 includes, for example, position, attitude, velocity, timing information, validity information, and other suitable information.

The illustration of aircraft tracking system 200 and the different components in FIGS. 1-17 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, sensor data 210 may also include data generated by a sensor system external to aircraft sensor system 206 that is external to aircraft tracking system 200. For example, sensor data 210 may include data generated by the avionics in aircraft 202. The sensor data may be received through a connection of aircraft tracking system 200 to a data bus meeting the standard ARINC 429 for digital information transfer.

In another illustrative example, ground estimator 1000, behavior trigger 1002, altitude handler 1004, power state handler 1006, and aircraft state logic 1008 in FIG. 10 may be combined into a single component that applies policy 518. In other illustrative examples, transmit state identifier 500 in FIG. 5 may be omitted.

In still another illustrative example, crew command handler 604 and the ground command handler 606 may be implemented in other components to process crew command 214 and ground command 218 for use by the components.

For example, crew command handler 604 and ground command handler 606 may be implemented in behavior analyzer 502 in FIG. 9.

Figure 18:
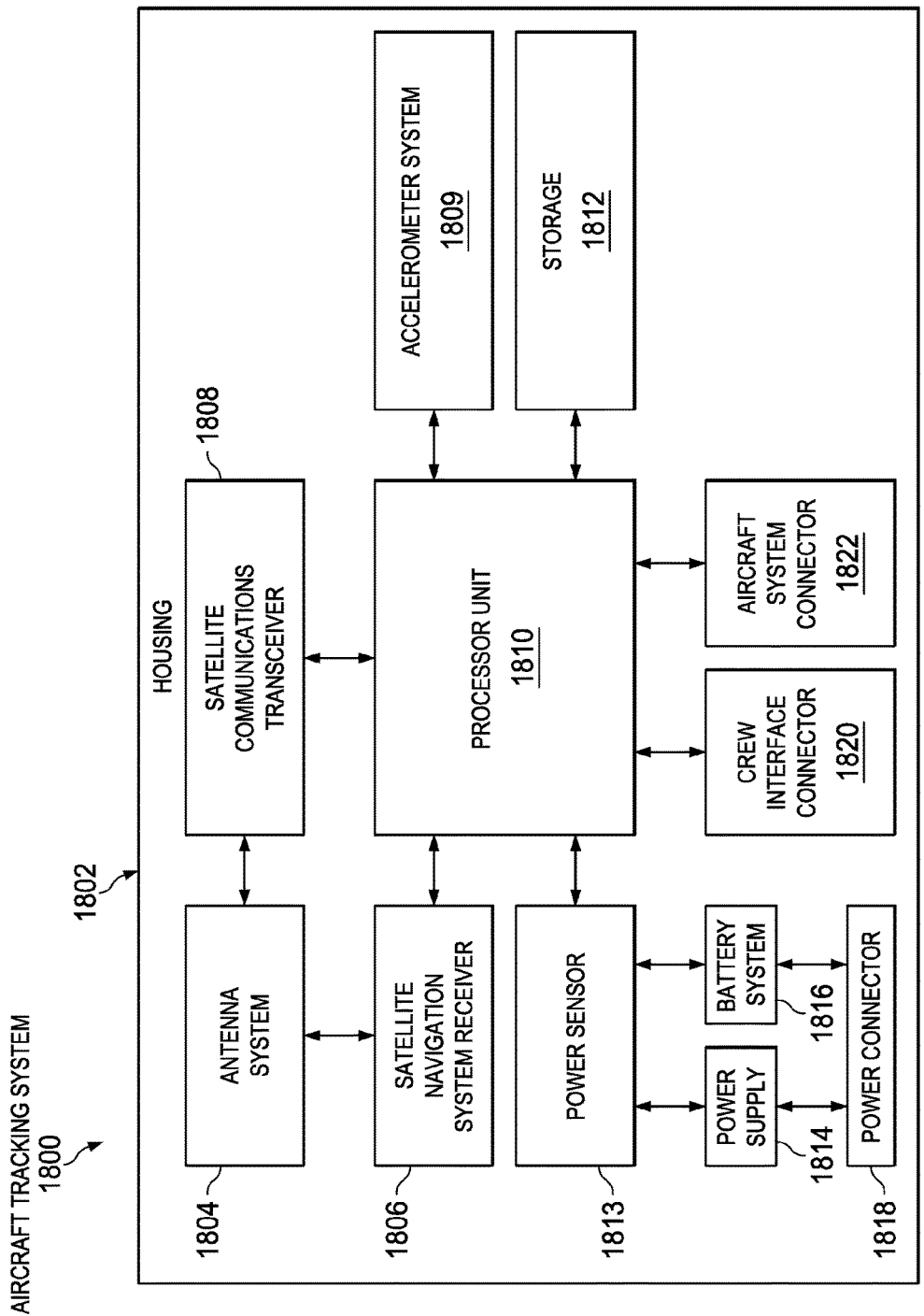
FIG. 18 is an illustration of a block diagram of an aircraft tracking system in accordance with an illustrative embodiment.

Turning now to FIG. 18, an illustration of a block diagram of an aircraft tracking system is depicted in accordance with an illustrative embodiment. As depicted, hardware components in aircraft tracking system 1800 are shown. Aircraft tracking system 1800 shows hardware components that may be used to implement tracker device 104 in FIG. 1 and aircraft tracking system 200 in FIG. 2. In this example, aircraft tracking system 1800 includes housing 1802.

In this illustrative example, aircraft tracking system 1800 is tamper-resistant. Housing 1802 is designed to make aircraft tracking system 1800 tamper-resistant in this example. Aircraft tracking system 1800 is considered tamper-resistant when the possibility of accessing or interfering with the operation of aircraft tracking system 1800 from inside an aircraft is reduced as much as desired or eliminated. For example, aircraft tracking system 1800 may be attached to the exterior of aircraft 202, and housing 1802 may be designed to limit the ability of undesired access to components inside of housing 1802.

Other types of installation designs may be used to reduce tampering with aircraft tracking system 1800. For example, the routing of wires may be made through areas in which access is more difficult from within the aircraft. As depicted, hardware components inside aircraft tracking system 1800 include antenna system 1804, satellite navigation system receiver 1806, satellite communications transceiver 1808, an accelerometer system 1809, processor unit 1810, storage 1812, power sensor 1813, power supply 1814, and battery system 1816.

Satellite navigation system receiver 1806 receives navigation signals from satellites in a satellite navigation system through antenna system 1804. For example, without limitation, satellite navigation system receiver 1806 may receive navigation signals from satellites in a global navigation satellite system selected from at least one of the Global Positioning System (GPS), the Global Navigation Satellite System (GLONASS), or some other suitable global navigation satellite system.

Satellite navigation system receiver 1806 generates sensor data, such as sensor data 210 in FIG. 2 in this example. For example, satellite navigation system receiver 1806 identifies the position of an aircraft.

As depicted, satellite communications transceiver 1808 sends and receives information for ground segment communications through a satellite in a satellite communications system. For example, satellite communications transceiver 1808 receives ground command 218 in FIG. 2 and sends state information 222 in FIG. 2. The satellite communications system may be, for example, an Iridium satellite constellation, Globalstar, or some other suitable satellite communications system.

In this illustrative example, processor unit 1810 is an example of one type of hardware in which aircraft tracker 204 in FIG. 2 may be implemented. As depicted, processor unit 1810 may be one or more processors selected from at least one of a central processing unit, a multi-processor core, a digital signal processor, or some other type of processor, depending on the particular implementation.

In this illustrative example, accelerometer system 1809 generates sensor data describing the attitude of an aircraft. The attitude may include at least one of role, pitch, or yaw, as well as rates for these types of attitudes.

Storage 1812 stores information and program code for use by processor unit 1810. Storage 1812 is one or more storage devices, and a storage device is any piece of hardware that is capable of storing information, such as, for example, without limitation, at least one of data, program code in functional form, or other suitable information either on a temporary basis, a permanent basis, or both on a temporary basis and a permanent basis. Storage 1812 may include at least one of memory and persistent storage. Memory in these examples may be, for example, a random access memory or any other suitable volatile or non-volatile storage device. Persistent storage may contain one or more components or devices. For example, persistent storage can be a hard drive, a solid state hard drive, a flash memory, a rewritable optical disk, a rewritable magnetic tape, or some combination of the above.

In the illustrative example, power supply 1814 is any electrical system that provides power in a form useable by other components in aircraft tracking system 1800 when power supply 1814 is connected to a primary or secondary power source in an aircraft. Battery system 1816 is one more batteries and may include circuits for charging the batteries and to deliver current to the other components in aircraft tracking system 1800. Battery system 1816 provides backup power for aircraft tracking system 1800.

As depicted, battery system 1816 aids in making aircraft tracking system 1800 tamper-resistant. For example, if the connection to the power source is cut or the power source is disabled, aircraft tracking system 1800 may still operate for some period of time.

Power sensor 1813 detects power supplied by power supply 1814 and battery system 1816. Power sensor 1813 provides data about the power detected to processor unit 1810. This data is an example of sensor data.

In this illustrative example, aircraft tracking system 1800 has a number of different connections. As depicted, aircraft tracking system 1800 includes power connector 1818, crew interface connector 1820, and aircraft system connector 1822.

Power connector 1818 provides a connection from power supply 1814 inside housing 1802 to one or more power sources in the aircraft. For example, power connector 1818 may be connected to the primary power supply, a battery backup system, an auxiliary power unit, or some other power source in an aircraft.

Crew interface connector 1820 provides processor unit 1810 a connection to a crew interface in the aircraft. In the illustrative examples, the crew interface may be, for example, a switch and a display on the flight deck of an aircraft.

In this illustrative example, aircraft system connector 1822 provides a connection between processor unit 1810 and the avionics in an aircraft. This connection may be through a data bus meeting the standard ARINC 429, or any other suitable type of bus, network, or communications medium for transmitting information.

The illustration of aircraft tracking system 1800 is only meant as an example of hard components that may be used to implement aircraft tracking system 1800, and not meant to limit the manner in which other illustrative examples may be implemented. For example, in other illustrative examples, other components in addition to satellite navigation system receiver 1806 may be used to provide sensor data. For example, an accelerometer system, an inertial measurement unit, or other devices may be used.

In yet another example, a capacitor system may be used in addition to or in place of battery system 1816 for providing power when the power source fails to provide power to aircraft tracking system 1800. In another illustrative example, aircraft system connector 1822 may be omitted from aircraft tracking system 1800.

Figure 19:
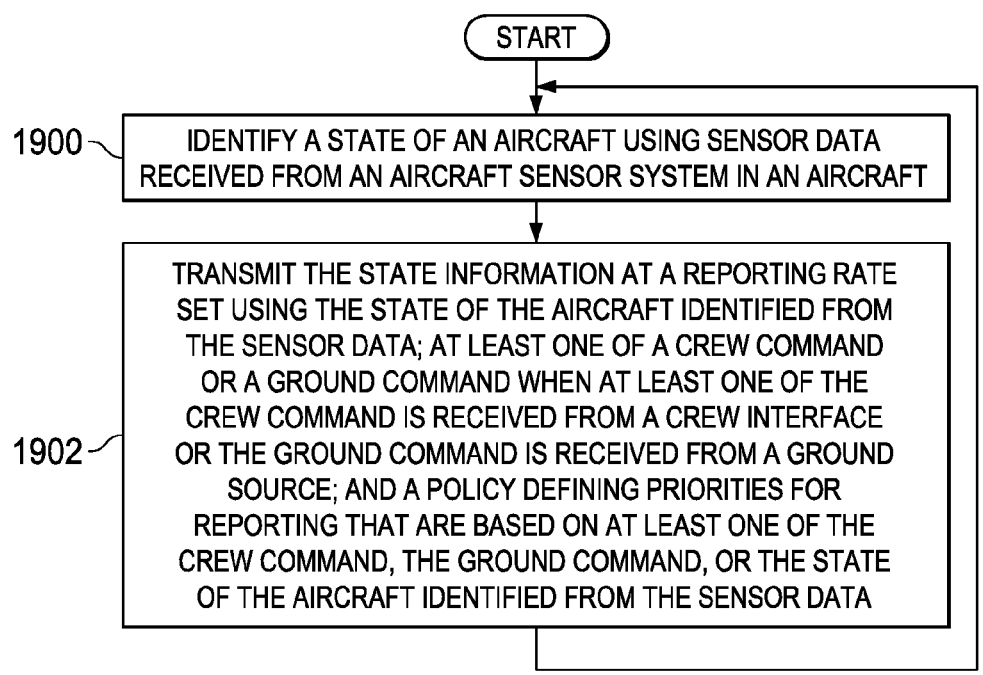
FIG. 19 is an illustration of a flowchart of a process for reporting state information in accordance with an illustrative embodiment.

Turning next to FIG. 19, an illustration of a flowchart of a process for reporting state information is depicted in accordance with an illustrative embodiment. The process illustrated in FIG. 19 is implemented in aircraft tracking system 200 in FIG. 2. In particular, the process may be implemented in aircraft tracker 204 in aircraft tracking system 200 in FIG. 2.

The process begins by identifying a state of an aircraft using sensor data received from an aircraft sensor system in an aircraft (operation 1900). The process transmits the state information at a reporting rate set using the state of the aircraft identified from the sensor data; at least one of a crew command or a ground command when at least one of the crew command is received from a crew interface or the ground command is received from a ground source; and a policy defining priorities for reporting that are based on at least one of the crew command, the ground command, or the state of the aircraft identified from the sensor data (operation 1902) with the process returning to operation 1900.

Figure 20:
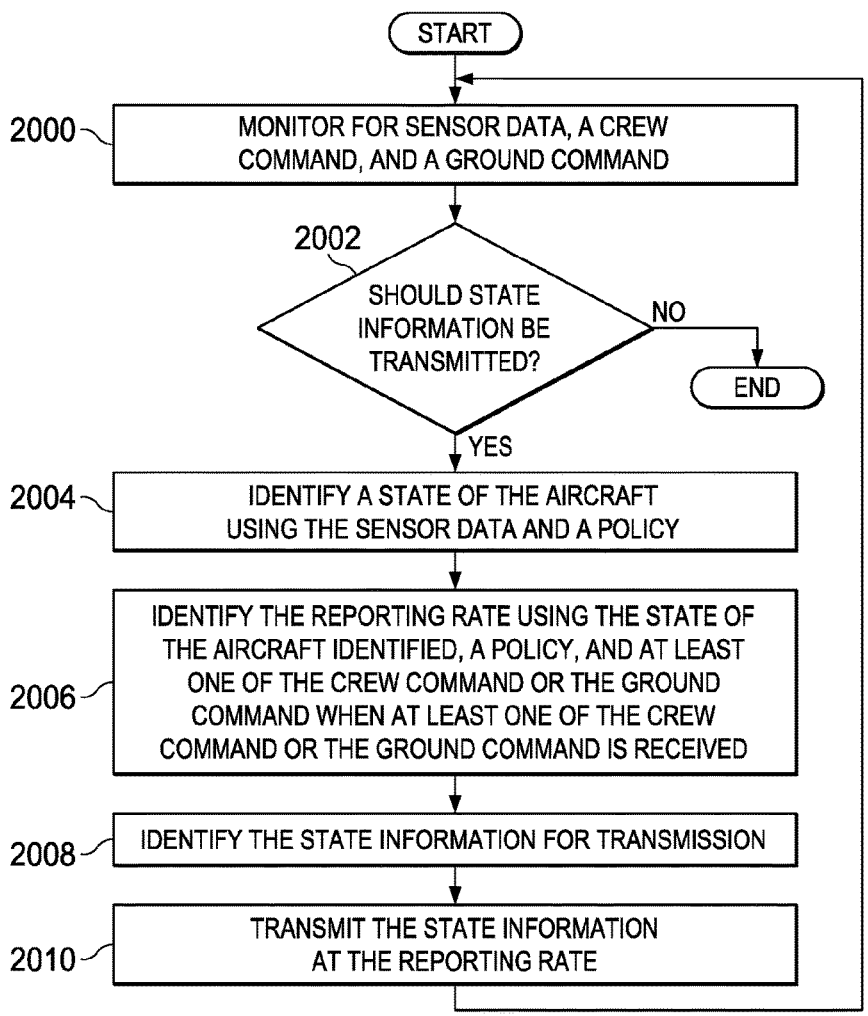
FIG. 20 is an illustration of a flowchart of a process for reporting state information in accordance with an illustrative embodiment.

With reference next to FIG. 20, an illustration of a flowchart of a process for reporting state information is depicted in accordance with an illustrative embodiment. The process illustrated in FIG. 20 may be implemented in aircraft tracker 204 in FIG. 2.

The process begins by monitoring for sensor data, a crew command, and a ground command (operation 2000). In operation 2000, sensor data is received from the aircraft sensor system in the aircraft tracking system. Additionally, sensor data may be also received from a sensor system in the aircraft. The crew command is received from a crew command interface, and the ground command is received from the ground source over a satellite communications system.

The process determines whether state information should be transmitted (operation 2002). If state information should not be transmitted, the process terminates. Operation 2002 is performed by transmit state identifier 500 in FIG. 5.

Otherwise, the process identifies a state of the aircraft using the sensor data and a policy (operation 2004). The policy includes one or more rules that are applied to the sensor data to identify the current state of the aircraft. Operation 2004 is performed by behavior analyzer 502 in FIG. 5.

The process identifies the reporting rate using the state of the aircraft identified, a policy, and at least one of the crew command or the ground command when at least one of the crew command or the ground command is received (operation 2006). Operation 2006 is performed by aircraft state information reporter 504 in FIG. 5.

The policy in operation 2006 includes rules that define reporting rates based on the state of the aircraft. The policy also may include data used to apply the rules. The policy also includes rules that define reporting rates when a crew command, a ground command, or both are received. In this manner, the policy defines a priority in setting the reporting rate based on input from a crew member, a ground source, and the state identified for the aircraft. For example, if the aircraft tracker has the highest priority, a rate in the input from the crew member or the ground would not change the reporting rate as set by the aircraft tracker. In the illustrative example, the priority may be selected in a manner that reduces tampering and increases autonomy in setting the reporting rate.

The process identifies the state information for transmission (operation 2008). Operation 2008 is performed by aircraft state information reporter 504 in FIG. 5. The process transmits the state information at the reporting rate (operation 2010) with process returning to operation 2000 as described above. Operation 2010 also is performed by aircraft state information reporter 504 in FIG. 5.

Figure 21:
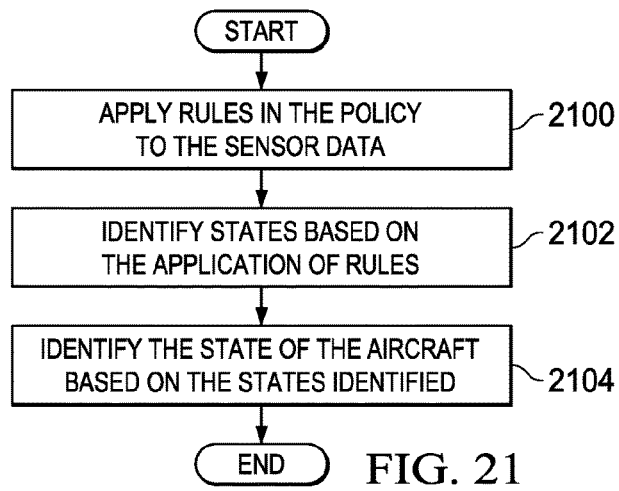
FIG. 21 is an illustration of a flowchart of a process for identifying the state of an aircraft in accordance with an illustrative embodiment.

With reference next to FIG. 21, an illustration of a flowchart of a process for identifying the state of an aircraft is depicted in accordance with an illustrative embodiment. The process illustrated in FIG. 21 is an example of one implementation for operation 2004 in FIG. 20.

The process begins by applying rules in the policy to the sensor data (operation 2100). The process identifies states based on the application of rules (operation 2102). For example, a rule with respect to altitude may indicate that the state of the aircraft is "normal" with respect to altitude. Another rule for pitch of the aircraft may indicate that the aircraft is "abnormal" when that rule is applied to the sensor data. A third rule, with respect to power, may indicate a distress situation is present when the rule is applied to the power information in the sensor data.

The process then identifies the state of the aircraft based on the states identified (operation 2104) with the process terminating thereafter. In operation 2104, all of the rules may result in the same state being identified. In some cases, some rules may indicate a "normal" state while another rule indicates an "abnormal" state. In yet another example, one rule may indicate a "normal" state, a second rule may indicate a "distress" state, while a third rule indicates an "abnormal" state.

These different states are resolved in operation of 2104 using a policy defining the priority of states. For example, the priority may be "distress," "abnormal," and "normal," with "distress" having the highest priority and "normal" having the lowest priority.

Figure 22:
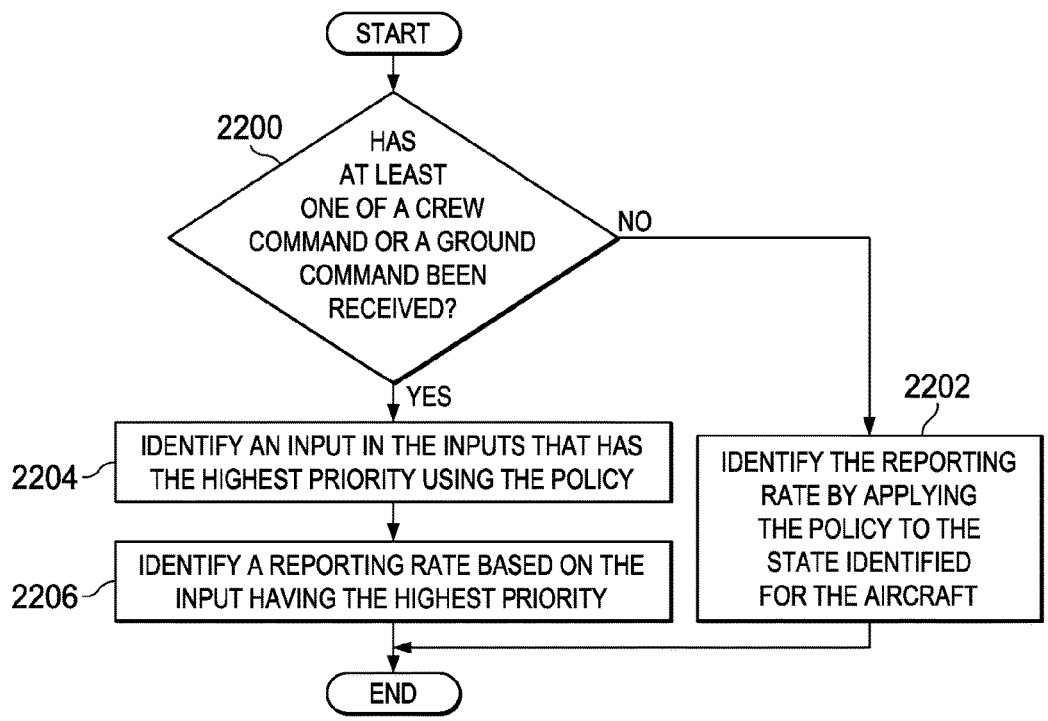
FIG. 22 is an illustration of a flowchart of a process for identifying a reporting rate in accordance with an illustrative embodiment.

Turning next to FIG. 22, an illustration of a flowchart of a process for identifying a reporting rate is depicted in accordance with an illustrative embodiment. The process illustrated in FIG. 22 is an example of one implementation for operation 2004 in FIG. 20.

The process begins by determining whether at least one of a crew command or a ground command has been received (operation 2200). If neither a crew command nor a ground command has been received, the process identifies the reporting rate by applying the policy to the state identified for the aircraft (operation 2202) with the process terminating thereafter. In applying the policy to the state, the location of the aircraft also may be taken into account depending on the implementation.

If at least one of a crew command or a ground command has been received, at least one of the crew command or the ground command and the state of the aircraft are inputs. With reference again to operation 2200, if at least one of a crew command or ground command has been received, the process identifies an input in the inputs that has the highest priority using the policy (operation 2204). For example, the policy may give the highest priority to the input that identifies a "distress" state. In another example, if the crew command indicates an "abnormal" state while stating the aircraft has been identified as "normal," the crew input has the highest priority.

The process then identifies a reporting rate based on the input having the highest priority (operation 2206). The process terminates thereafter.

Figure 23:
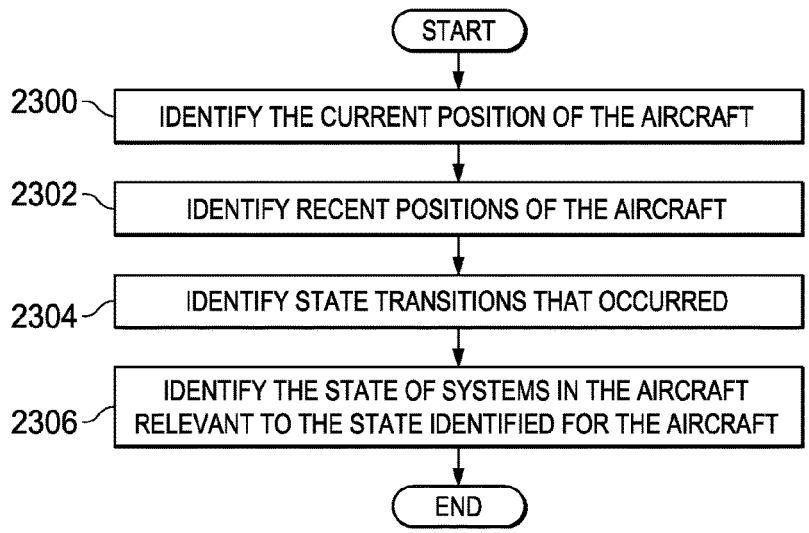
FIG. 23 is an illustration of a flowchart of a process for identifying state information in accordance with an illustrative embodiment.

Turning now to FIG. 23, an illustration of a flowchart of a process for identifying state information is depicted in accordance with an illustrative embodiment. The process illustrated in FIG. 23 is an example of an implementation for operation 2006 in FIG. 20.

The process begins by identifying the current position of the aircraft (operation 2300). The process identifies recent positions of the aircraft (operation 2302).

The process identifies state transitions that occurred (operation 2304). The state transitions included are based on some number of transitions or transitions occurring within some period of time. For example, in operation 2304, a "normal" state, an "abnormal" state, and a normal state may be included in state transitions because these states occurred within a one hour period of time. Further, the duration of each state may be included in the state transitions.

The process identifies the state of systems in the aircraft relevant to the state identified for the aircraft (operation 2306) with the process terminating thereafter. In operation 2306 the state of the aircraft may have been identified as "abnormal." Systems associated with the parameters identified as "abnormal" are included as systems identified in operation 2304. The state of the systems may be identified for inclusion in the state information.

In the event that the state is "normal," then no systems may be included in the state information. Alternatively, the state for a default set of systems may be used. As used herein, "a set of," when used with respect to items, means one or more items. For example, a set of systems is one or more systems.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in operation 2006, the identification of the state information for transmission may be performed using a policy having rules that identify what information should be included in the state information. The policy may select state information based on the state of the aircraft.

Figure 24:
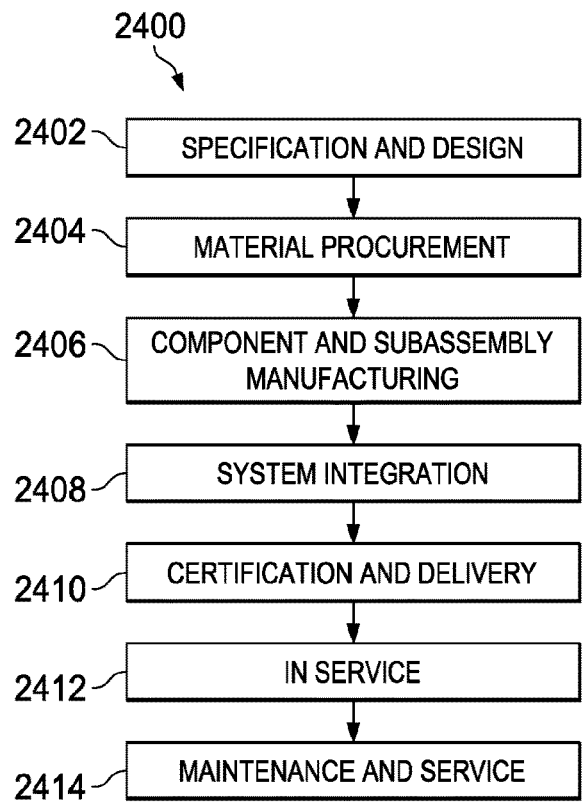
FIG. 24 is an illustration of a block diagram of an aircraft manufacturing and service method in accordance with an illustrative embodiment.
Figure 25:
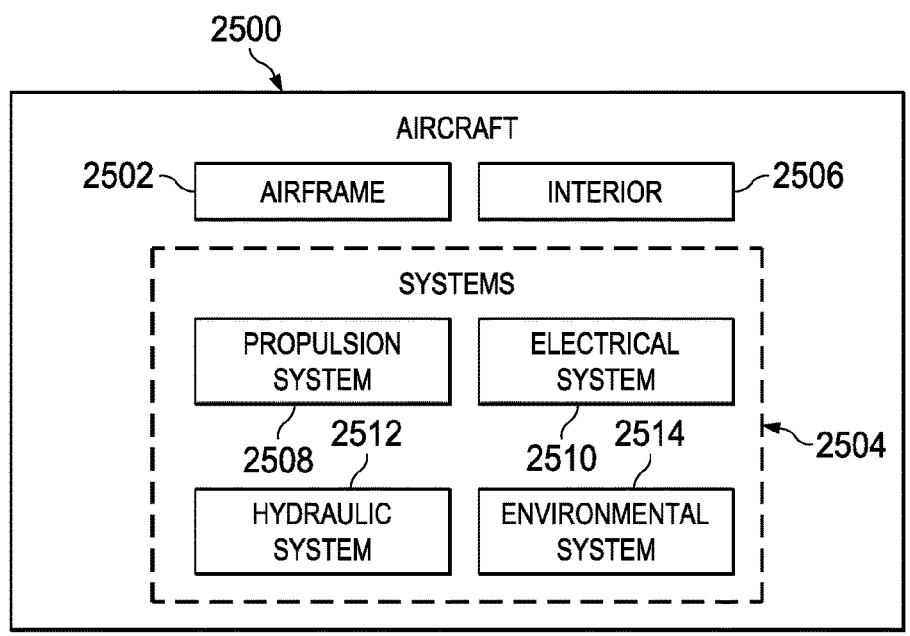
FIG. 25 is an illustration of a block diagram of an aircraft in accordance with an illustrative embodiment.

Illustrative embodiments of the disclosure may be described in the context of aircraft manufacturing and service method 2400 as shown in FIG. 24 and aircraft 2500 as shown in FIG. 25. Turning first to FIG. 24, an illustration of a block diagram of an aircraft manufacturing and service method is depicted in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 may go through certification and delivery 2410 in order to be placed in service 2412. While in service 2412 by a customer, aircraft 2500 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of a block diagram of an aircraft is depicted in which an illustrative embodiment may be implemented. In this example, aircraft 2500 is produced by aircraft manufacturing and service method 2400 in FIG. 24, and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In one illustrative example, components or subassemblies produced in component and subassembly manufacturing 2406 in FIG. 24 may be fabricated or manufactured in a manner similar to components or subassemblies produced while aircraft 2500 is in service 2412 in FIG. 24. For example, components for the aircraft tracking system 200 in FIG. 2 may be manufactured in either of the stages.

In another illustrative example, aircraft tracking system 200 may be added to aircraft 202 during system integration 2408 or maintenance and service 2414. As yet another example, one or more apparatus embodiments, method embodiments, or a combination thereof may be utilized while aircraft 2500 is in service 2412, during maintenance and service 2414 in FIG. 24, or both. For example, aircraft tracking system 200 in FIG. 2 may be used during flight of aircraft 2500 while in service 2412 or when being tested during maintenance and service 2414.

Thus, the illustrative examples provide a method and apparatus for tracking an aircraft. For example, an illustrative example provides a method and apparatus for reporting state information about an aircraft. In the illustrative example, the reporting is performed in a manner that overcomes the technical problem with tampering of aircraft tracking systems. One or more technical solutions report state information about the aircraft based on a policy that defines priorities between commands from at least one of the crew or a ground source and the state identified by the aircraft tracking. The use of the policy increases the autonomy in an aircraft tracking system. The policy also still allows some influence from commands sent from at least one of the crew or a ground source in a manner that takes into account a desire to reduce tampering.

The description of the different illustrative embodiments has been presented for purposes of illustration and description, and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises an aircraft tracker that comprises:
    a behavior analyzer configured to generate a state of an aircraft based upon sensor data and a rule in policies configured to:
        define a priority between: a crew command from a crew interface, a ground command from a ground source, and an autonomous mode of the aircraft tracker;
        specify parameters considered from the sensor data, received from a sensor system, that determine the state of an aircraft;
        control a latch, in the behavior analyzer in the aircraft tracker, configured to hold the state of the aircraft, output from the behavior analyzer and received by an aircraft state information reporter, to a worst state, identified by an aircraft state identifier, until a reset; and
        specify a priority that allows the reset in flight; and
    a rate identifier configured to set a reporting rate for the aircraft state information reporter based upon the state of the aircraft, and responsive to the priority based upon a reception of at least one of:
        the crew command from the crew interface; and
        the ground command from the ground source, such that an identification, by the aircraft tracker, of a distress state for the aircraft, precludes a compliance, by the rate identifier, with a command, received from at least one of the crew interface and the ground source, to change the reporting rate; and the aircraft state information reporter configured to transmit, state information that comprises the state of the aircraft, at the reporting rate.

2. The apparatus of claim 1, further comprising:
    the state of the aircraft comprising one of: normal, abnormal, and distress;
    the parameters being specified from a group that comprises: an attitude, a bank angle, a roll rate, a persistence time, and a geofencing dependence, of the aircraft; and
    the aircraft tracker comprising:
        the behavior analyzer configured to identify, based upon a policy, in the policies, applied to the sensor data, the state of the aircraft; and
        the aircraft state information reporter being configured to, responsive to reception of at least one of: the crew command, or the ground command, and based upon the state of the aircraft identified from the sensor data and the at least one of the crew command or the ground command, transmit the state of the aircraft at the reporting rate.

3. The apparatus of claim 2 further comprising:
    a transmit state identifier configured to indicate whether the state of the aircraft should be transmitted; and
    the aircraft state information reporter comprising:
        the rate identifier configured to identify, responsive to reception of at least one of: the crew command, or the ground command, and based upon the state of the aircraft identified from the sensor data and the at least one of: the crew command, or the ground command, the reporting rate; and
        the aircraft state information reporter configured to:
            identify the state of the aircraft for transmission; and
            transmit, responsive to an indication in the transmit state identifier that the state of the aircraft should be transmitted, the state of the aircraft at the reporting rate.

4. The apparatus of claim 2, further comprising the behavior analyzer configured to identify the state of the aircraft based upon sensor data received from the sensor system and a policy that defines states of the aircraft based on the sensor data.

5. The apparatus of claim 1 further comprising:
    the aircraft state information reporter comprising the rate identifier; and
    the crew interface configured to generate the crew command and send the crew command to the aircraft tracker.

6. The apparatus of claim 1, further comprising the aircraft tracker configured to select a policy in the policies based on a selection received in the ground command that limits an ability to disable, via the crew interface, reporting by the aircraft tracker.

7. The apparatus of claim 1, wherein the sensor system comprises at least one of:
    a satellite navigation system;
    an inertial measurement unit; and
    an accelerometer system.

8. The apparatus of claim 1, further comprising the aircraft tracker configured to transmit the state of the aircraft at the reporting rate based upon a location of the aircraft.

9. The apparatus of claim 1, wherein the sensor data comprises: a location of the aircraft, altitude, attitude, power information, a number of parameters for a maneuver performed by the aircraft, airspeed, roll angle, roll rate, pitch angle, pitch rate, pressure, temperature, and a fuel use.

10. The apparatus of claim 1 further comprising:
    a housing that comprises the aircraft tracker and the sensor system located inside the housing, and the housing being tamper-resistant.

11. The apparatus of claim 1, wherein the state of the aircraft comprises information that comprises at least one of: the state of the aircraft identified, the sensor data, and information derived from the sensor data.

12. An apparatus that comprises an aircraft tracker that comprises:
    a behavior analyzer configured to generate a state of an aircraft based upon sensor data and a rule in policies configured to:
        define a priority between: a crew command from a crew interface, a ground command from a ground source, and an autonomous mode of the aircraft tracker, the aircraft tracker configured to select a policy in the policies based on a selection received in the ground command;

specify parameters considered from the sensor data, received from a sensor system, that determine a state of an aircraft, the parameters being specified from a group that comprises: an attitude, a bank angle, a roll rate, a persistence time, and a geofencing dependence, of the aircraft;

control a latch, in the behavior analyzer in the aircraft tracker, configured to hold a state of the aircraft, output from the behavior analyzer and received by an aircraft state information reporter, to a worst state, identified by an aircraft state identifier, until a reset, such that a hierarchy of the worst state descends from distress to abnormal to normal; and specify a priority that allows the reset in flight; and an aircraft state information reporter that comprises a rate identifier configured to determine a reporting rate based upon the state of the aircraft, and responsive to the priority based upon a reception of at least one of:

the crew command from the crew interface; and the ground command from the ground source, such that an identification, by the aircraft tracker, of a distress state for the aircraft, precludes a compliance, by the rate identifier, with a command, received from at least one of the crew interface and the ground source, to change the reporting rate; and the aircraft state information reporter configured to transmit, in a tamper resistant manner, aircraft state information at the reporting rate.

13. The apparatus of claim 12, further comprising the aircraft state identifier comprising: an on ground estimator, a behavior trigger, an altitude handler, and a power state handler.

14. The apparatus of claim 13, further comprising the on ground estimator configured to receive data from sensors that comprise a sensor of: an altitude, a ground speed, a vertical speed, a configuration of landing gear, an airspeed, and a cabin pressurization, respectively.

15. The apparatus of claim 12, further comprising the aircraft tracker configured to receive: the sensor data, the crew command, and the ground command.

16. The apparatus of claim 12, further comprising the aircraft tracker comprising a transmit state identifier configured to receive geofence data.

17. The apparatus of claim 12, further comprising the aircraft state identifier configured comprising: an on ground estimator, a behavior trigger, an altitude handler, and a power state handler, each responsive to the policies.

18. The apparatus of claim 12, further comprising the aircraft state identifier configured to identify the state of the aircraft based upon: an attitude, a current position, and an altitude, of the aircraft for a designated persistence time.

19. An apparatus configured to secure a reporter in an aircraft against tampering, such that the apparatus comprises:

an aircraft tracker that comprises: a transmit state identifier, policies, a behavior analyzer, and an aircraft state information reporter, such that:

the transmit state identifier comprises: a crew command handler, a ground command handler, and a position handler;

the policies being configured to:

define a priority between: a crew command from a crew interface, a ground command from a ground source, and an autonomous mode of the aircraft tracker, the aircraft tracker configured to select a policy in the policies based on a selection received in the ground command;

specify parameters considered from sensor data, received from a sensor system, that determine a state of an aircraft, the parameters being specified from a group that comprises: an attitude, a bank angle, a roll rate, a persistence time, and a geofencing dependence, of the aircraft;

control a latch, in a behavior analyzer in the aircraft tracker; and specify a priority that allows a reset of the latch in flight;

the behavior analyzer comprises: an aircraft state identifier, and the latch, the aircraft state identifier configured to generate the state of the aircraft based upon: a rule in the policies, and the sensor data; and the aircraft state information reporter comprises a rate identifier configured to set a reporting rate, and a reporter configured to transmit state information at the reporting rate.

20. The apparatus of claim 19, further comprising the latch configured to hold a state of the aircraft, output from the behavior analyzer and received by an aircraft state information reporter, to a worst state, identified by an aircraft state identifier, until a reset, such that a hierarchy of the worst state descends from distress to abnormal to normal.

* * * * *

UNITED STATES PATENT AND TRADEMARK OFFICE
CERTIFICATE OF CORRECTION

PATENT NO. : 10,030,995 B2
APPLICATION NO. : 14/858235
DATED : July 24, 2018
INVENTOR(S) : Adler et al.

Page 1 of 1

It is certified that error appears in the above-identified patent and that said Letters Patent is hereby corrected as shown below:

In the Claims

Column 27, Line 2, Claim 12 change "a state" to --the state--
Column 27, Line 3, Claim 12 change "an aircraft" to --the aircraft--
Column 28, Line 8, Claim 19 change "a state" to --the state--
Column 28, Line 27, Claim 19 change "a behavior analyzer" to --the behavior analyzer--
Column 28, Line 42, Claim 20 change "an aircraft state identifier" to --the aircraft state identifier--

Signed and Sealed this
Thirtieth Day of October, 2018

Andrei Iancu
*Director of the United States Patent and Trademark Office*